(12) United States Patent
Reina et al.

(10) Patent No.: US 10,284,423 B2
(45) Date of Patent: May 7, 2019

(54) ROBUST ON-LINE RECONFIGURATION (OLR) AND SYNCHRONIZATION PROTOCOL FOR DIGITAL SUBSCRIBER LINE (DSL)

(71) Applicant: Sckipio Technologies S.I LTD, Ramat Gan (IL)

(72) Inventors: Guy Reina, Giv'atayim (IL); Rami Verbin, Tel Aviv-Yafo (IL)

(73) Assignee: Sckipio Technologies S.I LTD, Ramat Gan (IL)

( * ) Notice: Subject to any disclaimer, the term of this patent is extended or adjusted under 35 U.S.C. 154(b) by 0 days.

(21) Appl. No.: 14/899,347

(22) PCT Filed: Jun. 18, 2014

(86) PCT No.: PCT/IL2014/050554
§ 371 (c)(1),
(2) Date: Dec. 17, 2015

(87) PCT Pub. No.: WO2014/203255
PCT Pub. Date: Dec. 24, 2014

(65) Prior Publication Data
US 2016/0142255 A1    May 19, 2016

Related U.S. Application Data

(60) Provisional application No. 61/836,178, filed on Jun. 18, 2013, provisional application No. 62/013,221, filed on Jun. 17, 2014.

(51) Int. Cl.
G06F 11/00 (2006.01)
H04L 12/24 (2006.01)
(Continued)

(52) U.S. Cl.
CPC ........ *H04L 41/0816* (2013.01); *H04J 3/0658* (2013.01); *H04L 1/0003* (2013.01);
(Continued)

(58) Field of Classification Search
CPC ..... H04L 41/0816; H04L 43/08; H04L 41/12; H04L 1/0003; H04L 1/0023; H04L 5/1438; H04J 3/0658
(Continued)

(56) References Cited

U.S. PATENT DOCUMENTS 6,205,410 B1    3/2001    Cai
2001/0048667 A1   12/2001    Hamdi
(Continued)

FOREIGN PATENT DOCUMENTS

EP       1324557 A1      7/2003
JP    2008-510395 A      4/2008
(Continued)

OTHER PUBLICATIONS

Extended European Search Report dated Dec. 15, 2016 for European Application No. 14812920.8 (10 Pages).
(Continued)

*Primary Examiner* — Chuong T Ho
(74) *Attorney, Agent, or Firm* — Brown Rudnick LLP

(57) ABSTRACT

A method for maintaining configuration synchronization via an on-line reconfiguration (OLR) of system configuration parameters in a communication system having at least a first communication entity and a second communication entity that employ a reference configuration of system parameters, the method comprising the procedures of monitoring changes to at least one channel characteristic in at least one communication channel that links the first communication entity and the second communication entity; determining by the first communication entity an updated configuration that
(Continued)

is constructed based on at least one modification relative to the reference configuration according to changes to the at least one channel characteristic; transmitting an OLR request from the first communication entity to the second communication entity via the at least one communication channel; receiving the OLR request by the second communication entity; and employing the updated configuration by the first communication entity and by the second communication entity.

20 Claims, 9 Drawing Sheets

(51) Int. Cl.
  *H04L 1/00* (2006.01)
  *H04L 5/14* (2006.01)
  *H04J 3/06* (2006.01)
  *H04L 12/26* (2006.01)
  *H04L 12/28* (2006.01)

(52) U.S. Cl.
  CPC .......... *H04L 1/0023* (2013.01); *H04L 5/1438* (2013.01); *H04L 41/12* (2013.01); *H04L 43/08* (2013.01)

(58) Field of Classification Search
  USPC ......................................... 370/252, 254, 253
  See application file for complete search history.

(56) References Cited

U.S. PATENT DOCUMENTS

| | | | |
|---|---|---|---|
| 2002/0080867 A1 | 6/2002 | Abbas et al. | |
| 2002/0172188 A1 | 11/2002 | Wunsch | |
| 2003/0118089 A1 | 6/2003 | Deczky | |
| 2004/0249916 A1* | 12/2004 | Graves | H04L 12/4675 709/223 |
| 2005/0147043 A1 | 7/2005 | Schelstraete et al. | |
| 2006/0176942 A1* | 8/2006 | Oksman | H04L 1/0025 375/222 |
| 2008/0253401 A1* | 10/2008 | Thyagarajan | H04L 5/0042 370/485 |
| 2008/0260011 A1 | 10/2008 | Peeters et al. | |
| 2009/0310502 A1* | 12/2009 | Nuzman | H04B 3/32 370/252 |
| 2010/0014645 A1* | 1/2010 | Feng | H04B 3/46 379/27.01 |
| 2011/0211624 A1* | 9/2011 | Van de Wiel | H04B 3/32 375/222 |
| 2011/0274147 A1* | 11/2011 | Schelstraete | H04L 1/1887 375/220 |
| 2013/0013753 A1* | 1/2013 | Zessin | G06F 9/4411 709/221 |
| 2013/0279687 A1* | 10/2013 | Wei | H04L 1/0002 379/350 |

FOREIGN PATENT DOCUMENTS

| | | |
|---|---|---|
| WO | 0217584 A2 | 2/2002 |
| WO | 2011143101 A1 | 11/2011 |

OTHER PUBLICATIONS

International Search Report and Written Opinion of the International Search Authority for International Application No. PCT/IL2014/050554 dated Nov. 11, 2014 (14 Pages).

ITU-T Recommendation G.998.4 (2010)—Amendment 1: Series G: Transmission System and Media, Digital system networks; Digital Sections and Digital Line System—Access Networks: Asymetric Digital Subscriber Line Tranceiver 2 (ADSL2). Improved impulse noise protection for DSL transceivers. Edition 1.3. Section 7. Internaitonal Telecommunication Union, Jun. 30, 2011 (78 Pages).

Notification of Reasons for Refusal dated Mar. 27, 2018 for Japanese Application No. 2016-520803, Machine Translation Included (5 Pages).

* cited by examiner

ROBUST ON-LINE RECONFIGURATION (OLR) AND SYNCHRONIZATION PROTOCOL FOR DIGITAL SUBSCRIBER LINE (DSL)

FIELD OF THE DISCLOSED TECHNIQUE

The disclosed technique relates to the field of digital communications, in general, and to a robust on-line reconfiguration (OLR) protocol for maintaining synchronization in communication systems, in particular.

BACKGROUND OF THE DISCLOSED TECHNIQUE

Digital subscriber lines (DSLs) are technologies designed to provide the means for communication over copper wires (twisted pairs, loop) of the existing plain old telephone service (POTS) infrastructure. Such an infrastructure typically includes a central office (CO) employing at least one distribution point (DP) that provides data services to a plurality end-users (i.e., also known as subscribers) that employ devices known as customer premises equipment (CPE) units. The architecture of hybrid communication networks such as very-high-bit-rate digital subscriber line (VDSL) or G.fast (fast access to subscriber terminals) combine the use of an optical fiber segment and a DSL (or G.fast) segment, where the latter stretches along typically the last couple hundred meters over the existing copper wire infrastructure toward the endpoint subscriber. In G.fast, communication equipment is located at the DP and is linked over the communication lines with typically a plurality of corresponding communication equipment (CPEs, e.g., modems) located at the customers' (subscribers') ends.

For proper operation, the modem is generally operative, at least to some extent, to adapt its respective transmission parameters to varying communication line conditions. These transmission parameters have to be known at both ends, so that a receiver will be able to correctly decode received signals from a transmitter. In certain circumstances, however, such as in instances of elevated levels of electronic interference exhibited in the loop, there is a need to change the existing system configuration on-line without causing interruption to the data service; this is what is known as on-line reconfiguration (OLR). Various types of OLR are known, for example, bit swapping, seamless rate adaptation (SRA), transmitter initiated gain adjustment (TIGA), and the like.

Other various methods and protocols for OLR are also known in the art. For example, U.S. Patent Application Publication No. U.S. 2006/0176942 A1 to Oksman et al., entitled "On-Line Reconfiguration and Synchronization Protocol for Multi-Carrier DSL" is directed at a communication system and method for providing an indication of a change in system configuration as a synchronization flag that is temporarily assigned to a plurality of data sub-channels to effectuate an on-line reconfiguration (OLR) of the communication system. The system employs provider and subscriber digital subscriber line (DSL) modems, which are connected via a communication channel and operative to transmit and receive communication signals. The method that is implemented by the system employs a fast OLR procedure that initially identifies free sub-channels that are not being used for data transmission based on a presently used bit loading table configuration. These plurality of free sub-channels are temporarily assigned to carry a synchronization flag, which in turn is transmitted over these sub-channels. The subscriber DSL modem receives and detects the synchronization flag and applies new parameters for subsequent incoming symbols. In order to prevent a possible situation where the synchronization flag is transmitted but not detected at subscriber DSL modem, the provider DSL modem delays the reconfiguration until the subscriber DSL modem sends back a synchronization flag acknowledgement over a sub-channel whereupon the reconfiguration occurs in a synchronized manner between provider DSL modem and subscriber DSL modem.

PCT International Publication Number WO 2011/143101 A1 to Schelstraete et al. and entitled "Systems and Methods for Retransmission with On-Line Reconfiguration" is directed at a system and method for performing retransmission with on-line reconfiguration in DSL systems. The system disclosed, which includes a transmitter and receiver, is a single link retransmission system in which a retransmission method with on-line reconfiguration is implemented. According to this method, a data stream is initially encoded into first frames according to a framing configuration. The transmitter receives a request for an OLR of the framing configuration from the receiver. In response to the request, the encoding of the data stream into the first frames is suspended. The transmitter then enters a retransmission state in which the transmitter transmits one or more first frames transmitted to the receiver during a retransmission time period that commences relative to the suspension of the encoding of the data streams into the first frames. The transmitter then sends an acknowledgement of the OLR request to the receiver. The encoding of the data stream into second frames is resumed according to a modified framing configuration that is consistent with the OLR. The transmitter transmits the second frames to the receiver upon expiration of the retransmission time period.

Reference is now made to FIG. 1, which is a schematic diagram showing an example of a prior art method, generally referenced 10, for enabling synchronization between a receiver and a transmitter via on-line reconfiguration. A horizontal position in FIG. 1 represents information pertaining either to a receiver 12, receiver OLR requests 14, a synchronization status 16, a transmitter 18, and a frame number 20. Frame number 20 identifies and enumerates a frame (frame i, frame i+1, etc.), which is a set of data symbols grouped together that is conveyed between a transmitter 18 and a receiver 12. A vertical position in FIG. 1 represents time in progressing frame units. Receiver 12 is communicatively coupled with transmitter 18, both of which require for synchronization of configuration therebetween. For this purpose, receiver 12 sends to transmitter 18 OLR requests 14, which in turn are to be implemented by transmitter 18. A synchronized state is when both receiver 12 and transmitter 18 employ an identical configuration, such as the same bit loading table (BLT). Synchronization status 16 represents the synchronization status between receiver 12 and transmitter 18.

In an initial state shown in FIG. 1 at frame i, both receiver 12 and transmitter 18 employ the same bit-loading table configuration (i.e., termed "BLT0") and hence they are synchronized. Suppose, in the upstream (US) direction, at frame i+1, receiver 12 sends an OLR request in the form of message 22 to transmitter 18 for a new configuration having a flat reduction by one bit from the previous configuration (i.e., BLT0). Transmitter 18 receives OLR message 22 and implements the new configuration (i.e., −1 bit) at frame i+4. Now suppose that due to increasing noise conditions receiver 12 sends a new OLR message 24 to transmitter 18 at frame i+5 for a new configuration having a flat reduction of six bits from the previous configuration to be implemented at frame i+7. In this case, however, suppose that that this message (i.e., OLR message 24) does not reach its intended destination (i.e., transmitter 18). At frame i+7 there is a loss of synchronization between receiver 12 and transmitter 18 since they do not employ the same configuration. Moreover, suppose that receiver 12 sends a new OLR message 26 to transmitter at frame i+8 for an additional flat reduction by two bits from the previous BLT and suppose further that this message is successfully received by transmitter 18. At frame i+10 receiver 12 implements the new configuration (i.e., having minus 9 bits), whereas transmitter implements a new configuration that is different (i.e., having minus 3 bits) thereby leading to a long-term loss of synchronization of between transmitter 18 and receiver 12. Since OLR requests are based on the assumption of successful reception and implementation of preceding (i.e., past, "historical") OLR requests, given a case where transmitter 18 fails to receive one of the OLR messages (e.g., OLR message 24), subsequently received OLR messages (e.g., OLR message 26) accumulate errors resulting in a mismatch of configuration between receiver and transmitter, consequently leading to a loss of synchronization.

Alternative prior art approaches may convey explicitly the absolute bit-loading table per carrier frequency. These approaches will generally be slower reacting (i.e., than the approach described in FIG. 1) as generally there is a need to convey larger amounts of information. These approaches require an acknowledgement based protocol, to make sure that both sides (e.g., transmitter and receiver) implement the newly communicated configuration at the same time.

SUMMARY OF THE PRESENT DISCLOSED TECHNIQUE

It is an object of the disclosed technique to provide a novel communication system implementing methods for maintaining synchronization via an on-line reconfiguration (OLR) of system configuration parameters as well as synchronizing the implementation of these system configuration parameters between communication entities that communicate with one another in the communication system. In accordance with one aspect of the disclosed technique, there is thus provided a method for maintaining configuration synchronization via an on-line reconfiguration (OLR) of system configuration parameters in a communication system having at least a first communication entity and a second communication entity that employ a reference configuration of system parameters. The method includes the procedures of monitoring changes to at least one channel characteristic in at least one communication channel that links the first communication entity and the second communication entity, determining by the first communication entity an updated configuration that is constructed based on modifications relative to the reference configuration according to changes to the at least one channel characteristic, transmitting an OLR request from the first communication entity to the second communication entity via the at least one communication channel, receiving the OLR request by the second communication entity, and employing the updated configuration by the first communication entity and by the second communication entity.

According to another aspect of the disclosed technique, there is thus provided a method for coordinated synchronization of the implementation of system configuration parameters via on-line reconfiguration (OLR) in a communication system, between a first communication entity and a second communication entity that employ an existing configuration of system configuration parameters. The method includes the procedures of determining by the first communication entity a counting sequence that specifies a progressive count toward the occurrence of a configuration update point where an updated configuration to the existing configuration is to be employed, transmitting at least once by the first communication entity to the second communication entity a counting sequence message, receiving at least once by the second communication entity the counting sequence message, and employing at the configuration update point the updated configuration by the first communication entity and by the second communication entity. The counting sequence message includes a current respective progressive count. The configuration update point is in relation to a reference point known to both said first communication entity and second communication entity.

In accordance with another embodiment of the disclosed technique, there it thus provided a communication system that maintains synchronization via an on-line reconfiguration (OLR) of system configuration parameters of the communication system, between at least a first communication entity in communication via at least one communication channel with a second communication entity that employ a reference configuration of system parameters. The communication system comprises a communication channel condition monitor, and a transmission parameter controller. The transmission parameter controller of the first communication entity is coupled with the communication channel condition monitor. The communication channel condition monitor of the first communication entity monitors at least one communication channel characteristic of respective at least one communication channel. The transmission parameter controller determines an updated configuration that is constructed based on modifications relative to said reference configuration, according to at least one change to said at least one communication channel characteristic, wherein the first communication entity communicates at least part of the updated configuration to the second communication entity, so as to employ the updated configuration by the first communication entity and by the second communication entity.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
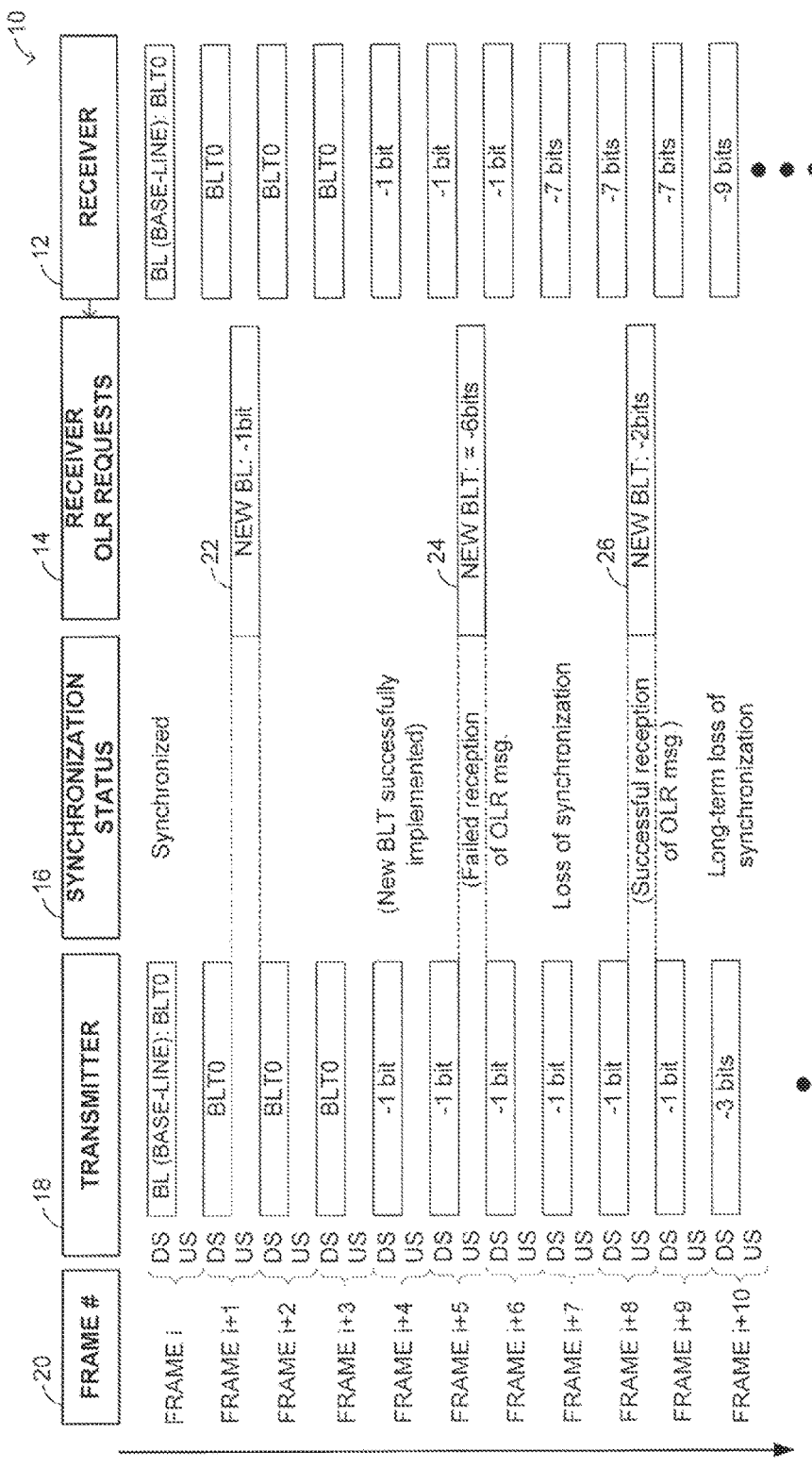
FIG. 1 is a schematic diagram showing an example of a prior art method, for enabling synchronization between a receiver and a transmitter via on-line reconfiguration.

The disclosed technique overcomes the disadvantages of the prior art by providing a communication system implementing methods for maintaining synchronization via an on-line reconfiguration (OLR) of system configuration parameters as well as synchronizing the implementation of these system configuration parameters between communication entities that communicate with one another in the communication system. In general, the system includes at least two communication entities (e.g., transmitter and receiver) that are communicatively coupled via at least one communication channel or medium. In particular, the principles of the disclosed technique are implemented in digital subscriber line (DSL) communication systems, such as in G.fast (fast access to subscriber terminals), where data communicated between transmitters and receivers of the communication it system is modulated according to discrete multi-tone (DMT) modulation.

The disclosed technique involves two main aspects. The first main aspect involves a robust protocol for maintaining configuration synchronization via OLR of system configuration parameters. The protocol facilitates a combination of baseline (reference) configuration and active (updated) configuration, where the baseline configuration is operative for accurately tracking and adjusting to slow changes in prevailing channel characteristics of communication channels, whereas the active configuration is operative to have a faster response time but is generally less accurate (i.e., in comparison to baseline configuration). Temporary configuration changes are applied on top of (e.g., over) the baseline configuration (e.g., gradationally). For example, a temporary configuration change may be initiated by the transmitter and may include changes (e.g., positive delta, negative delta) over the baseline configuration. The baseline configuration is kept (i.e., used, stored for example in a memory device) as a reference for constructing the temporary configuration. The temporary (updated) configuration is constructed based on modifications relative to the baseline (reference) configuration according to detected changes to the channel characteristics which may include changes in the transmit path (i.e., precoder updates, requiring configuration changes). The baseline configuration is not used as such for encoding transmission signals. Typically, only the temporary configuration is used for encoding purposes. A special case is where no adjustments are required over (i.e., in relation to) the baseline configuration. In this case, the temporary configuration is identical to the baseline configuration and the temporary configuration is still used for encoding the transmit signals.

The second main aspect provides a robust OLR protocol that facilitates coordinated synchronization of the implementation of system configuration parameters between at least one pair of intercommunicating communication entities even when reconfiguration messages may be lost. In particular, there is provided a method for coordinated synchronization of the implementation of system configuration parameters, between a first communication entity and a second communication entity that employ an existing configuration of system configuration parameters. According to this method the first communication entity determines a counting sequence (e.g., a timing sequence) that specifies a progressive count (e.g., a countdown, count-up) toward the occurrence of a configuration update point (e.g., an update time) where an updated configuration to the existing configuration is to be employed. The first communication entity provides (e.g., transmits) at least once (i.e., typically multiple times) a counting sequence message that includes the current respective progressive count (e.g., the current value of the count), as well as may include the updated configuration. The second communication entity is operative to receive the counting sequence message (as well as the updated configuration) at least once the once (i.e., typically multiple times, hence the robustness). Both the first and second communication entities are then operative to employ the updated configuration at the configuration update point. According to this aspect of the disclosed technique, there are generally two main modes of operation for initiating OLR requests: transmitter-initiated OLR requests and receiver-initiated OLR requests.

In receiver-initiated OLR, a receiver initiates and constructs an OLR request, which is in the form of an electronic message (i.e., an "OLR message"), which includes information pertaining to a new configuration change. Each request for OLR is assigned a unique identification number. The receiver of the OLR request (i.e., the transmitter, the "responder") responds to the receiver-initiated OLR request by indicating the expected point (e.g., in time) where (or when) the updated configuration will take effect. This response by the responder is in the form of a response message. This response message by the responder includes a counting sequence (e.g., a timing sequence) that specifies a progressive count toward the occurrence of a configuration update point where an updated configuration to the existing configuration is to be employed (i.e., simultaneously by both parties). In receiver-initiated OLR, the OLR request relates to changes in the system configuration parameters used by this receiver. The transmitter (usually) indicates the configuration number used for encoding the transmission in following transmissions. The initiator of the OLR can use this configuration number to recover synchronization in case one or more previous OLR messages were lost.

In transmitter-initiated OLR, the transmitter initiates and constructs an OLR request in the form of an OLR message that is communicated to the receiver. In this case, a unique identification number may not be employed. According to this mode, the OLR message that includes information pertaining to the updated configuration change (e.g., settings) may be communicated (repetitively, reiteratively) over each frame transmitted to the receiver. Additionally, the OLR message of the transmitter specifies the expected point (e.g., in time) where (or when) the new configuration will take effect (i.e., simultaneously by both parties).

In summary, the disclosed technique therefore involves two main aspects. The first aspect involves preserving synchronization between communication entities (e.g., transmitter and receiver) of the communication system via OLR so that these communication entities that communicate with each other keep the same system configuration parameters (i.e., a "coherent image" of parameters). Example system configuration parameters include bit loading table (BLT) (i.e., per subcarrier, per sub-band), forward error correction (FEC) parameters, gain tables (per subcarrier, per sub-band), framing parameters, data transmission unit (DTU) size, and the like.

The second aspect involves a way of synchronizing the implementation (e.g., time) of new or modified system configuration parameters, via OLR, that will be employed synchronously by the communication entities that communicate with one another in the communication system (e.g., between a transmitter and receiver).

The terms "communication line" and "communication channel" expressed either in singular or in plural are interchangeable throughout the Detailed Description and the Claims and refer to a medium (e.g., electrical conductor, optical conductor, air, etc.) through which communication signals (e.g., bearing information, noise, etc.) are conveyed, typically between transmitters and receivers (or transceivers) of a communication system.

The terms "sub-channels", "subcarriers", and "subcarrier frequencies" used herein throughout the Detailed Description and the Claims are interchangeable and refer to a fundamental component of a signal that is carried over a main communication carrier signal. Particularly, in DMT modulation, a main channel (or "channel") bandwidth (BW) is partitioned into a plurality of sub-channels (frequency ranges), such that typically the center frequency of each sub-channel is denoted as its subcarrier. Bits are modulated on the subcarrier for transmission over the channel.

The term "communication parameter" used herein throughout the Detailed Description and the Claims refers to any variable, characteristic, attribute or property associated with the design, construction, operation or functionality of a communication system to which it refers. The term "communication entity" used herein throughout the Detailed Description and the Claims refers to either one of a receiver, transmitter, or transceiver of the communication system. According to one (a first) mode of operation of the disclosed technique, the first communication entity is operative as a receiver and the second communication entity is operative as a transmitter. In this mode of operation, an OLR request relates to changes in system configuration parameters of the receiver. According to another (second) mode of operation of the disclosed technique, the first communication entity is operative as a transmitter and the second communication entity is operative as a receiver. In this mode of operation, an OLR request relates to changes in system configuration parameters used by the transmitter. These different modes of operations will be described in the following description and the identification of which communication entity is a receiver and which is a transmitter is evident according to the relevant context. It is noted that a communication entity typically implements a transceiver whose operability encompasses both transmitter and receiver functionalities. A communication entity may refer to the provider of the communication service (e.g., a central office (CO), a distribution point (DP), etc.), as well as to the subscriber of the communication service (e.g., customer premises equipment (CPE)) of the communication system (e.g., DSL).

The terms "temporary configuration" and "active configuration" used herein throughout the Detailed Description and the Claims are interchangeable and refer to a particular changed or updated configuration of system parameters in relation to a reference (baseline) configuration of system parameters. The use of a slash mark '/' (also termed "forward slash") throughout the detailed description, the drawings, and the claims, indicates a mutually exclusive selection between two choices on opposite sides (i.e., right and left) of the slash mark. For example, 'A/B' would indicate a choice of either A (and not B) or B (and not A).

Figure 2:
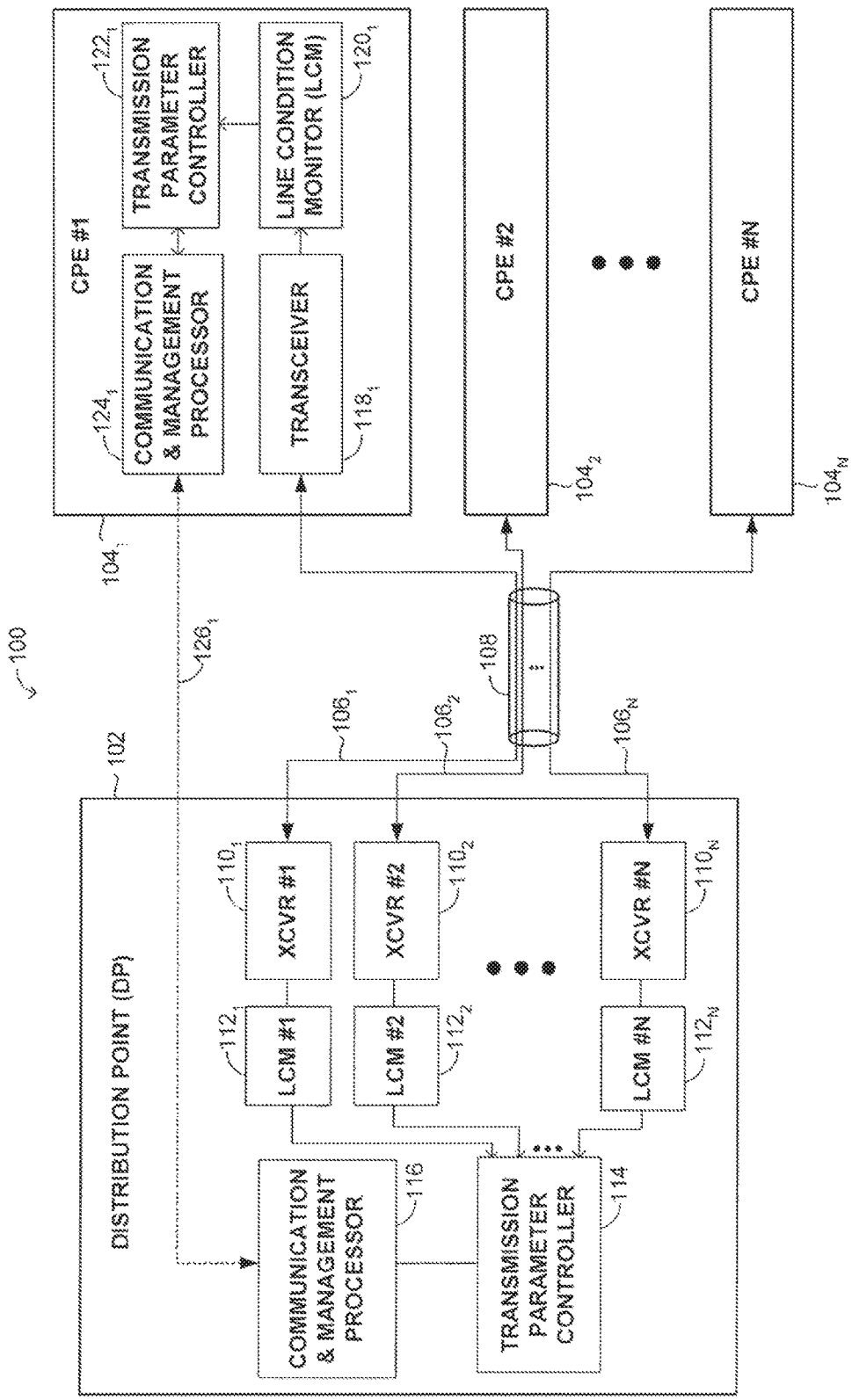
FIG. 2 is a schematic block diagram illustrating a simplified general overview of a communication system, constructed and operative in accordance with an embodiment of the disclosed technique.

Reference is now made to FIG. 2, which is a schematic block diagram illustrating a simplified general overview of a communication system, generally referenced 100, constructed and operative in accordance with an embodiment of the disclosed technique. Communication system 100 includes a distribution point (DP) 102, coupled with a plurality of N customer premises equipment (CPE) units $104_1, 104_2, \ldots, 104_N$, via a plurality of N communication channels $106_1, 106_2, \ldots, 106_N$ that pass through a cable binder 108. The capital letter N represents a positive integer (index). DP 102 includes a plurality of N transceivers (XCVRs) $110_1, 110_2, \ldots, 110_N$, a plurality of N line condition monitors (LCMs) $112_1, 112_2, \ldots, 112_N$, a transmission parameter controller 114, and a communication & management processor 116. Each one of N CPE units $104_1, 104_2, \ldots, 104_N$ includes the following components (shown for CPE unit $104_1$, and similarly for CPE units $104_2$ through $104_N$ for respective index numbers 2 through N): a transceiver $118_1$, a transmission parameter controller $118_1$, a line condition monitor $120_1$, a transmission parameter controller $122_1$, and a communication & management processor $124_1$. Each transceiver $110_1, 110_2, \ldots, 110_N$ of DP 102 is coupled to a respective transceiver of CPE units $104_1, 104_2, \ldots, 104_N$. Specifically, transceiver $110_1$ of DP 102 is coupled with transceiver $118_1$ of CPE unit $104_1$, transceiver $110_2$ is coupled with transceiver $118_2$ (not shown) of CPE unit $104_2$, and so forth. For simplicity. DP 102 as well as transceivers $110_1, 110_2, \ldots, 110_N$ thereof will be referred herein by a naming convention as the "DP side". Conversely, CPE units $104_1, 104_2, \ldots, 104_N$ will be referred herein by a naming convention as the "CPE side", "CPEs" or simply as the "subscriber" and in plural "subscribers", unless indicated otherwise.

At the DP side, transceivers $110_1, 110_2, \ldots, 110_N$ each respectively coupled to line condition monitors $112_1, 112_2, \ldots, 112_N$, which in turn are all coupled with transmission parameter controller 114. Transmission parameter controller 114 is further coupled with communication & management processor 116. At the CPE side (with reference to CPE unit $104_1$), transceiver $118_1$ is coupled with line condition monitor $120_1$, which in turn is coupled with transmission parameter controller $122_1$. Transmission parameter controller $122_1$ is further coupled with communication & management processor $124_1$. The communication & management processor of each CPE is coupled with the communication & management processor 116 of DP 102 via a respective management channel. In particular, management channel $126_1$ communicatively couples communication & management processor $124_1$ of CPE $104_1$ with the communication & management processor 116 of DP 102. Similarly, management channel $126_2$ (not shown) communicatively couples communication & management processor $124_2$ (not shown) of CPE $104_2$ with the communication & management processor 116 of DP 102, and so forth. Management channels $126_1 \ldots 126_N$ (only $126_1$ shown) are logical in-band control channels (i.e., not physical channels), which communicate control data through the respective physical communication lines $106_1, \ldots, 106_N$ that communicate main (payload) data (i.e., as such, management channel $126_1$ is represented by a dotted line in FIG. 2). In an alternative realization (not shown) of system 100, communication & management processor 116 and transmission parameter controller 114 are implemented by a single entity (e.g., a processing unit) that is operative to perform the same functions thereof. Analogously, the communication & management processor (e.g., $124_1$) and transmission parameter controller (e.g., $122_1$) of each CPE unit (e.g., $104_1$) are implemented by a single entity (e.g., a processing unit) that is operative to perform the same functions thereof (not shown). Further alternatively, DP 102 includes a dedicated processing unit (not shown) for each of N communication channels $106_1, \ldots, 106_N$ that is operative to perform the functions of the communication & management processor (116) and the transmission parameter controller 114.

During initialization of communication system 100, DP 102 and CPEs $104_1, 104_2, \ldots, 104_N$ exchange information pertaining to various communication parameters and capabilities (i.e., in the form of "capability lists") in order to establish ("negotiate") a common mode of operation. In particular, with reference to FIG. 2, communication & management processor $124_1$ and communication and management processor 116 communicate via management channel $126_1$ so as to establish values for various communication parameters according to an agreed-upon standard protocol (e.g., ITU-T G.994.1). Typical communication parameters include the upstream to downstream (US/DS) ratio, initial modulation parameters, clock and symbol alignment. Later during initialization, additional parameters are set such as the initial bit loading table (BLT) (per subcarrier), initial gain adjustment table, power spectral density (PSD) masks, data transmission unit (DTU) size, crosstalk cancellation parameters of joining and already active lines, etc. Communication parameters may include channel characteristics, which are attributes of a communication channel (or channels) that influence the transmission and reception parameters of that channel (e.g., signal-to-noise ratio (SNR), far-end cross-talk (FEXT) level, the signal-to-noise-plus-interference ratio (SNIR), the signal-to-FEXT ratio, transfer function related characteristics, noise characteristics of the channel (e.g., static noise, transient noise), block-error-rate (BLER), bit-error-rate (BER), changes in the transmit path between transmitter and receiver (i.e., precoder updates that require configuration changes), etc.). In general, communication & management processors $124_1$, $124_2$ (not shown onward), $\ldots, 124_N$ at the CPE side as well as communication & management processor 116 are operative to manage logical channels (e.g., robust management channel (RMC), embedded operation channel (EOC)) as well as the communication protocols employed to convey control data therebetween. The process in which initial communication parameters are determined is termed as "initialization". Initialization typically involves a plurality of phases or steps such as a handshake and discovery phase, a training phase, and a channel evaluation and analysis phase. Once initialization is completed the communication system enters a data exchange phase and in particular, when bearer data (e.g., payload data) is being transmitted, this is what is typically known as "showtime".

When communication system 100 enters showtime, a baseline configuration (i.e., the "initial configuration", "reference configuration") is set and thereafter updated either entirely or partially. Frame bearer data (or simply "data"), is communicated between transceivers $110_1, 110_2, \ldots, 110_N$ of DP 102 and respective transceivers $118_1, 118_2, \ldots, 118_N$ of CPE units $104_1, 104_2, \ldots, 104_N$ via respective communication lines $106_1, 106_2, \ldots, 106_N$. For example, in the downstream (downlink) direction, transceiver $110_1$ of the DP, i.e., DP 102 transmits data to the subscriber i.e., transceiver $118_1$ of CPE unit $104_1$. Similarly, transceiver $110_2$ transmits data to transceiver $118_2$, and so forth. Conversely, in the upstream (uplink) direction, the transceivers of the CPE units transmit data to the respective transceivers of the DP. For example in the upstream direction, transceiver $118_1$ transmits data to transceiver $110_1$, and similarly this applies to the other interconnected pairs of transceivers: $110_2$ and $118_2$, $110_3$ and $118_3$, etc.

The disclosed technique is operative to perform OLR so as to enable reconfiguration of system configuration parameters in response to varying channel characteristics ("channel conditions") while minimizing potential interruptions to the transmission and reception of data propagating through a communication channel and averting as much as possible a re-training of the communication link. Channel characteristics typically vary in time given the architecture, environment, and operability of DSL communication systems. Examples of varying channel characteristics include changes to the SNR (e.g., due to transient crosstalk noise increase in the binder, radio frequency interference (RFI), etc), changes (e.g., reduction) to the transmit power of particular subcarrier frequencies whose signals propagate through the communication channel, changes to available bandwidth, acknowledgement (ACK) and/or disacknowledgement (NACK) indications (e.g., messages), and the like.

Given the varying channel characteristics that require OLR to be performed in response thereto, it is crucial to synchronize changes to system configuration parameters between transmitters and receivers so as to prevent loss of the communication link as well as to preserve robustness and to ensure performance quality of that link. Some of the known OLR types, such as bit swapping, however, are not particularly apt at certain circumstances to manage abrupt changes to channel characteristics. For example, in bit swapping, bits ($b_i$) and gains ($g_i$) (i.e., transmit power) from subcarriers exhibiting a degraded SNR margin are reallocated to subcarriers exhibiting an excess SNR margin. The appropriate bit swapping parameters $b_i$ and $g_i$ are then communicated and synchronized between receiver and transmitter, a process which may transpire over a period of tens to even hundreds of milliseconds. If, however, the noise level changes more rapidly than the implementation of a new configuration, then errors may ensue before the communication link has been adapted to the new configuration.

The disclosed technique provides a fast rate OLR method for adapting to abruptly varying channel characteristics by determining an updated configuration of system configuration parameters that is constructed based on at least one (typically a plurality) of modification relative to a reference configuration even in the event where a previous request for OLR has been lost (i.e., due to miscommunication) for example, as a result of degraded channel conditions. The disclosed technique therefore provides a way to maintain configuration synchronization of system configuration parameters between receivers and transmitters of the communication system without the need for an acknowledgement based protocol that is inherently slow. Particularly, the receiver (e.g., DP 102) does not generally require transmission of an acknowledgment (ACK) message upon reception of an OLR request from a transmitter that initiated the request. In order to preserve synchronization of system configuration parameters between different communication entities that communicate with each other, it is essential that each of these entities continuously utilize the same system configuration parameters in a coordinated manner (e.g., synchronously), including immediately after an OLR procedure, otherwise synchronization may be lost. In particular, DP 102 and CPE units $104_1$, $104_2$, ..., $104_N$ have to concurrently employ matching system configuration parameters, such as BLT, FEC parameters, and the like.

The initial configuration is typically set (e.g., provided, downloaded, transmitted by the DP side or by the CPE side, etc.) as part of the initialization phase. This initial configuration includes values to the various system configuration parameters that may change entirely, partially or not at all in response to an OLR requirement. System 100 is operative to monitor and to detect changes to a plurality of channel characteristics that would possibly necessitate initiation of OLR of system configuration parameters. In particular, line condition monitors $112_1$, $112_2$, ..., $112_N$ of DP 102 are operative to monitor and to detect (e.g., in real-time) changes to prevailing channel characteristics in respective communication lines $106_1$, $106_2$, ..., $106_N$. Likewise, line condition monitors $120_1$, $120_2$, ..., $120_N$ of the CPEs are each operative independently (of each other) to monitor and to detect (e.g., in real-time) changes to prevailing channel characteristics in respective communication lines $106_1$, $106_2$, ..., $106_N$. At the DP side, transmission parameter controller 114 of DP 102 is operative to determine whether the detected changes of the channel characteristics require OLR. In general, a request for OLR is initiated either by the DP side or the CPE side, where the particulars of which will be elaborated hereinbelow. Conversely, at the CPE side, the transmission parameter controllers $122_1$, $112_2$, ..., $112_N$ are each operative to determine independently whether the detected changes to the channel characteristics of each respective communication channel $106_1$, $106_2$, ..., $106_N$ require for OLR. For example, a determination may be made that OLR of system configuration parameters is required between CPE $104_1$ and DP 102 while not required for other transceiver-transceiver pairs (e.g., CPE $104_2$ and DP 102). (A transceiver-transceiver pair is defined as a pair of transceivers, one at the DP side (e.g., $110_1$) and one at the CPE side (e.g., $118_1$) that are linked via a communication channel (e.g., $106_1$). Such pairs are identified by the same index N.) This determination may be made by (at least part or combination of the following criteria): comparing the values of the current channel characteristics to a standard, a predetermined table of optimal values, a predetermined table of a range of values, a predetermined table of thresholds of values, according to a mathematical function (or expression), according to an algorithm, and the like.

The baseline (reference) system configuration that is employed by system 100 may be defined according to at least part of the following criteria: the division/partition of the BW into sub-bands, the BLT per subcarrier, the gain per subcarrier, and the like. The temporary (or active, updated) system configuration of system 100 may be defined according to at least part of the following criteria: changes to the BLT per subcarrier or per sub-band, changes to the gain per subcarrier or per sub-band, the update type (deltas (e.g., incremental, decremental), ceilings (upper-limits), floors (lower-limits), relative changes, differential changes, etc.), an identification (ID) number that identifies an index of a reference table over which modification shall be applied to construct the active (temporary) configuration, a mathematical function (or expression) through which the active configuration is constructed, a counting sequence that indicates a point (time) to implementation of the active configuration, an algorithm specifying how to construct the active configuration from at least one modification to the baseline configuration, a pointer to at least one database entry (i.e., stored by DP 102 and the CPEs) specifying the active configuration, and the like.

For the purposes of simplicity, we may classify possible changes to the system configuration parameters into three main categories:

1. A full change (i.e., all system configuration parameter values are assigned new values at once).
2. A partial change (i.e., only part of the system configuration parameter values are altered to new values, whereas other parameters keep their existing values (remain unchanged)).
3. Temporary change (i.e., changes that are applied on top of (over) the existing configuration, without changing a baseline configuration). This type of change is applied in relation to a reference configuration. An example of such a temporary change includes differential changes or deltas (positive/negative). Another example of a temporary change includes a bit load ceiling, and the like.

Figure 3:
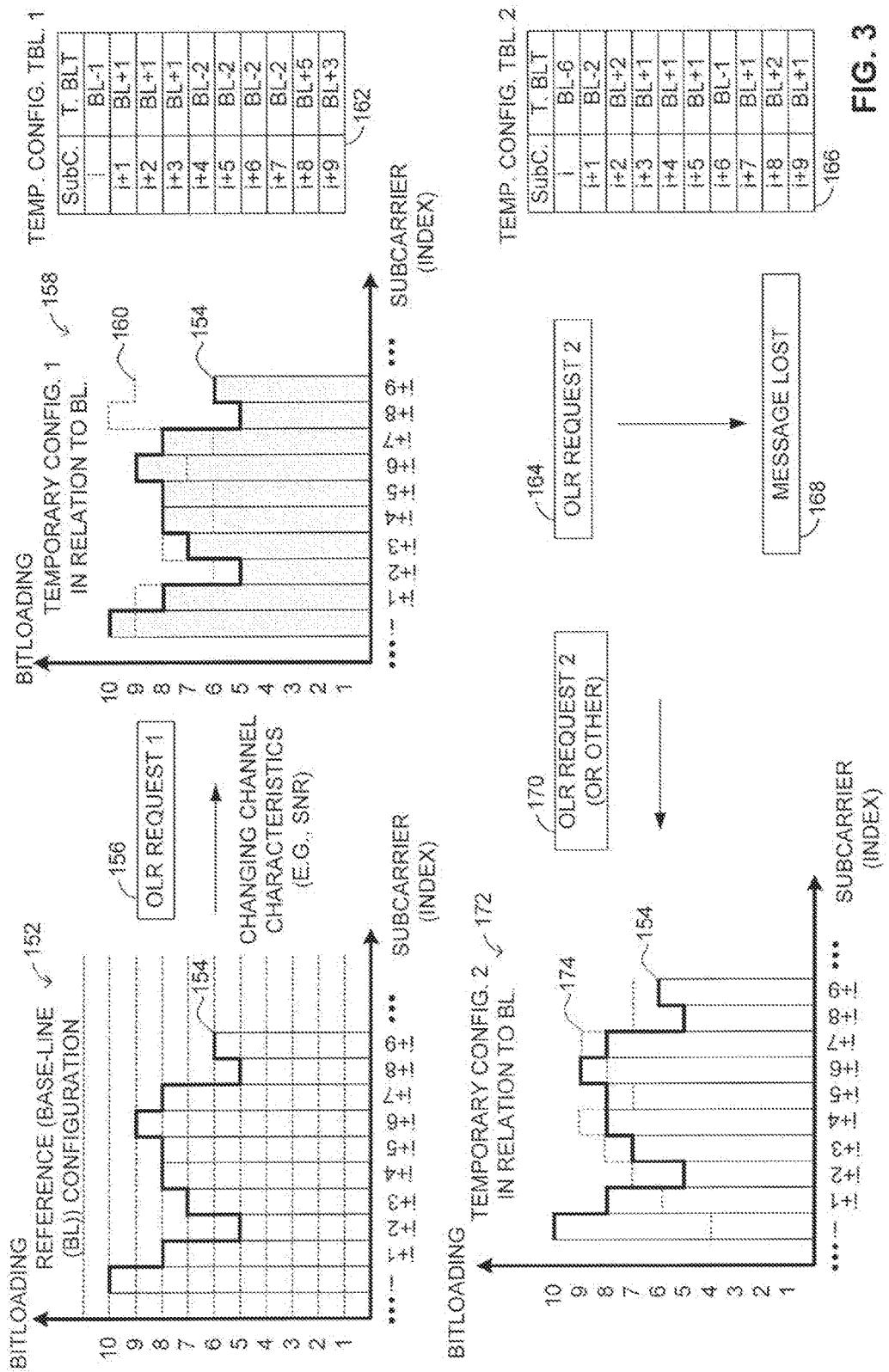
FIG. 3 is a schematic diagram illustrating temporary changes to a system configuration parameter in relation to a reference configuration, constructed and operative in accordance with the disclosed technique.

To demonstrate the principle in the utilization of temporary changes reference is now further made to FIG. 3, which is a schematic diagram illustrating temporary changes to a system configuration parameter in relation to a reference configuration, constructed and operative in accordance with the disclosed technique. FIG. 3 illustrates a reference configuration, also referred to as a "base-line configuration" that is employed by system 100 (FIG. 2). This reference configuration may also be the initial configuration. Without loss of generality, the system configuration parameter that is selected in FIG. 3 to elucidate the disclosed technique is the bit loading table (BLT), which defines the number of bits that are carried per subcarrier (i.e., whose index is an integer of the form: i, i+1, i+2, etc.). Alternatively, other system configuration parameters may be chosen to describe the principles of the disclosed technique, such as the gain ($g_i$) per subcarrier i, and the like. The gain parameter ($g_i$) per subcarrier i may be specified by the baseline configuration. Temporary modifications over this gain setting (typically in decibel (dB) units) (per subcarrier) may be specified to construct the active configuration. The top left graph in FIG. 3 illustrates a base-line (BL) configuration 152 that represents the BLT as a (step) function of the subcarrier index. The reference or base-line BLT is represented by a bold line 154. Suppose that due to monitored changing channel characteristics, such as the SNR levels at the receiver side or NACK (not acknowledged) indications received by the transmitter from the receiver end, in at least one of the communication lines $106_1$, ..., $106_N$, one of the communication entities of communication system 100 sends (e.g., via its respective transceiver—FIG. 2) an OLR request 156 (FIG. 3) in the form of an OLR message to another communication entity to which it is communicatively coupled (e.g., via communication channel $106_1$). Without loss of generality, suppose that the CPE side (FIG. 2) initiates a request for OLR by sending an OLR message to the DP side. For receiver-initiated OLR requests, OLR request 156 typically includes an identification (ID) (configuration) number, configuration data pertaining to the OLR request (i.e., defining changes or adjustments over the baseline reference configuration (e.g., BLT, gains, etc.), as well as a configuration change count counter (CCCC) that specifies (e.g., counts) the current number of configuration change. The CCCC is typically used as the configuration identifier. For transmitter-initiated OLR requests, the ID configuration number is used optionally (typically unused). Specifically, line condition monitor $120_1$ monitors changes in the channel characteristics of communication channel $106_1$ and conveys this information to transmission parameter controller $122_1$, which in turn determines a temporary configuration in relation to the baseline configuration. Information pertaining to this temporary configuration is conveyed to communication & management processor $124_1$, which in turn transmits it via logical management channel $126_1$ to the communication & management processor 116 of DP 102. The top right graph of FIG. 3 shows a temporary configuration 158 having a temporary BLT is represented by dotted line 160 plotted in relation to baseline BLT 154. A temporary BLT 162 that is represented in tabulated form, further exemplifies temporary changes to the baseline BLT per subcarrier index i. For example, for the subcarrier index i+4 the temporary bit load is reduced by two bits in relation to the baseline bit load. In receiver-initiated OLR, the configuration ID and updated configuration (i.e., including parameter changes over the baseline configuration) are transmitted to the transmitter, which in turn sends the CCCC and implements the updated configuration when the counter reaches zero. The transmitter receiving OLR request 156 may reply by sending an acknowledgement message (not shown) to the receiver that initiated the OLR request. Such an acknowledgment message may include a configuration update point, which may be a time reference indicating when the new configuration will be implemented (e.g., at a particular logical frame), as well as the current value of the CCCC. In transmitter-initiated OLR, the configuration ID and updated configuration are transmitted to the receiver. The transmitter starts a counting sequence (e.g., a countdown timing sequence) and implements the updated configuration at a configuration update point (e.g., particular number, for example zero of the countdown timing sequence). Typically, in receiver-initiated OLR, the transmitter receiving the OLR request is operative to reply to the receiver side with an acknowledgment message (i.e., via the management channels). Alternatively, if the transmitter side initiates an OLR request, the CPE receiving the OLR request may typically not reply to the DP side with an acknowledgement message (e.g., NACK). Following successful reception of temporary BLT 162 by DP 102, this new (updated) configuration is employed by both CPE $104_1$ and DP 102 at an update configuration time (i.e., that is known to both) according to a synchronization method that will be described in greater detail hereinbelow. In essence, the synchronization method allows for time-wise synchronization of the implementation of system configuration parameters to be performed via OLR between transmitter-receiver entities of the communication system. Generally, for transmitters and receivers (i.e., communication entities) to effectively communicate with each other, it is essential to maintain synchronization of system configuration between these entities.

Referring back to FIG. 3, now suppose due to further changes to channel characteristics CPE $104_1$ transmits another request for OLR 164 (e.g., by CPE $104_1$) to DP 102 in the form of an OLR message, but this message is somehow lost 168 (i.e., is corrupted, incomprehensible, or partly/fully not received by DP 102 due to for example, a degraded SNR). DP 102 may respond by sending a negative acknowledgement message (NACK) (not shown) indicating that the OLR message has not been received. There is also a possibility that DP 102 does not send back a NACK message (as it may not know that the transmitter sent a message). Alternatively, CPE $104_1$ may resend OLR request again as well as another different request 170. At any rate, new temporary configuration may be received and implemented in following frames or super-frames, thereby restoring synchronization in cases where there is a loss of synchronization. The bottom left graph of FIG. 3 shows a temporary configuration 172 having a temporary BLT that is represented by dotted line 174 (plotted in relation to baseline BLT 154) and corresponding BLT 166 in tabulated form (bottom right of FIG. 3).

In comparison with standard OLR (e.g., prior art) requests that transmit the entire configuration, the disclosed technique employs temporary configurations in relation to the baseline (reference) configuration that generally carry a smaller burden on message data size thus allowing for generally faster reception and implementation of new OLR requests. Accordingly, faster implementation times of OLR requests may be especially beneficial in circumstances where prevailing channel conditions may change more rapidly than the time required to receive and to implement standard OLR requests.

Moreover, standard OLR requests of prior art techniques are generally more prone to losses in synchronization. Particularly, according to prior art techniques, a standard OLR request leads to an updated BLT with subsequent OLR requests applied to the updated BLT. Consider the following simple example. Suppose a given "original" BLT and there is an initial request for a flat reduction of the constellations by one bit. Suppose further that if there is another request to further reduce the bit load by two bits, where a newer BLT will be derived. Hence this last new BLT will be lower by a total of three bits than the original BLT. A case where there is a loss or misinterpretation of one or more of these standard OLR messages may result in a permanent loss of synchronization since new changes to the BLT are depend on and are in relation to a previous configuration. This is roughly analogous to a having a chink in a chain, where each new configuration ("ring") relies on knowing the previous configuration ("adjacent ring").

In contrast, the disclosed technique employs temporary changes that are in relation to the baseline (reference) configuration. Compared to the above given prior art example of employing standard OLR requests for modifying the baseline configuration, the temporary configuration of the disclosed technique constructs temporary configurations to the baseline configuration. To further elucidate the disclosed technique, reference is now further made to FIG. 4, which is a schematic diagram demonstrating a method, generally referenced 200, employing temporary configurations in relation to a reference configuration for maintaining system configuration synchronization between communication entities of the communication system of FIG. 2, constructed and operative in accordance with the disclosed technique.

Figure 4:
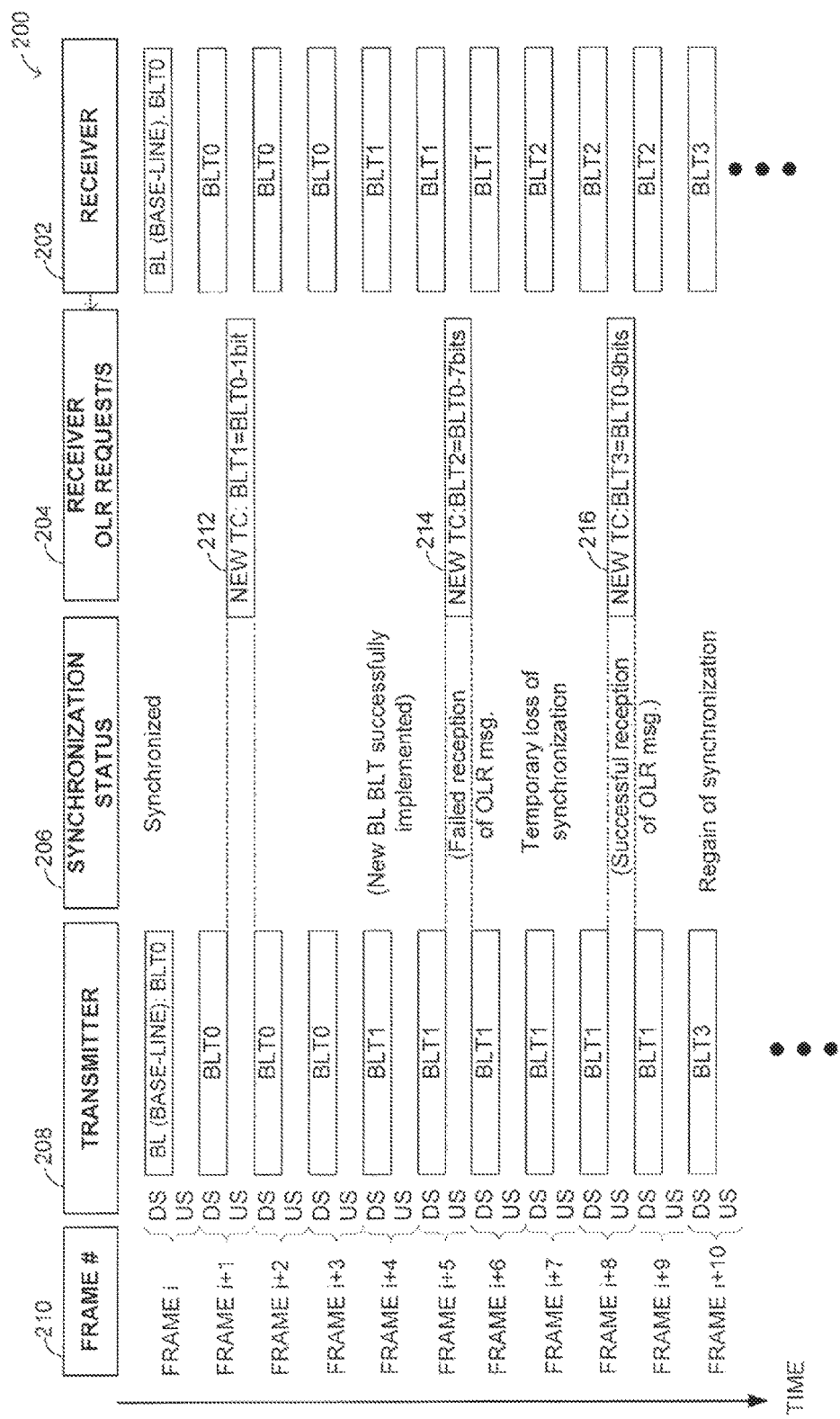
FIG. 4 is a schematic diagram demonstrating a method employing temporary configurations in relation to a reference configuration for maintaining system configuration synchronization between communication entities of the communication system of FIG. 2, constructed and operative in accordance with the disclosed technique.

A horizontal position in FIG. 4 represents information pertaining either to a receiver 202, receiver OLR requests 204, a synchronization status 206, a transmitter 208, and a frame number 210. Frame number 210 identifies and enumerates a frame (frame i, frame i+1, etc.). A vertical position in FIG. 4 represents time in progressing frame units. It is generally noted that according to one mode of operation, receiver 202 may be one of CPE units $104_1, \ldots, 104_N$ and transmitter may be DP 102. In another mode of operation, receiver 202 is DP 102 and transmitter 208 is one of CPE units $104_1, \ldots, 104_N$. In accordance with either mode of operation, receiver 202 and transmitter 208 are communicatively coupled with each other to allow for data communication to be communicated therebetween as well for the purpose of establishing synchronized configurations. For at least the latter purpose, receiver 202 sends to transmitter 208 OLR requests 204, which in turn are to be implemented by transmitter 208. A synchronized state is when both receiver 202 and transmitter 208 employ identical configuration system parameters, such as the same bit loading table (BLT). Synchronization status 206 represents the synchronization status between receiver 202 and transmitter 208. For simplification purposes, the BLT parameter is selected by way of example in relation to the description of FIG. 4, although the disclosed technique is not limited to a particular system configuration parameter, as other parameters may apply (e.g., the gain per subcarrier index, $g_i$, and the like).

Consider there is given an initial state in FIG. 4 at frame i, where both receiver 202 and transmitter 208 employ the same reference (e.g. baseline) configuration (i.e., termed "BLT0") and so they are synchronized. In other words, the reference configuration is made known to receiver 202 and transmitter 208 at least at initialization. Suppose, in the upstream (US) direction, at frame i+1, receiver 202 sends an OLR request in the form of message 212 to transmitter 208 for a new configuration having, for simplicity, a flat reduction by one bit from the reference configuration (i.e., BLT0). Transmitter 208 receives OLR message 212 and implements the new temporary configuration (TC) in relation to the reference configuration (i.e., New TC: BLT1=BLT0−1 bit) at frame i+4. OLR message 212 is successfully received by transmitter 208 and successfully implemented at frame i+4. Now suppose that due to changes to channel characteristics (e.g., increasing noise conditions) receiver 202 sends a new OLR message 214 to transmitter 208 at frame i+5 for a new temporary configuration having a flat reduction of seven bits from the reference configuration to be implemented at frame i+7, however this OLR message is lost or misinterpreted and does not properly reach its intended recipient (i.e., transmitter 208). In effect, at frame i+7 there is a temporary loss of synchronization between receiver 202 and transmitter 208 since they do not employ the same configuration. The disclosed technique provides a way to recover from this temporary loss of synchronization given a successful delivery of a new temporary OLR message 216 containing information pertaining to the requested OLR configuration (i.e., BLT3=BLT0−9 bits) in relation to the reference configuration (i.e., BLT0) to be implemented at frame i+10. At frame i+10, receiver 202 as well as the transmitter implement the new temporary configuration (BLT3), thereby regaining synchronization. Thus it can be noted from the above example, whereas a loss or misinterpretation of standard OLR messages (e.g., prior art) can lead to a permanent loss of synchronization, for the case of temporary changes, synchronization will be regained once the next OLR message is received. Since temporary OLR requests are in relation to a known reference configuration that is known at the outset to both transmitter and receiver, and are not dependent on knowledge of a preceding sequence of OLR requests that either one of which may be lost, there is substantially no accumulation or propagation of configuration synchronization errors. It is further noted that the aforementioned examples brought forth (e.g., with reference with FIGS. 3 and 4) equally apply interchangeably to DP 102 and each one of CPEs $104_1, \ldots, 104_N$. Given that both the receiver and the transmitter require usage of the same system configuration for proper operation, the disclosed technique provides mechanisms to manage both a configuration database at the DP side as well as the CPE side and to synchronize the implementation of configuration changes.

The disclosed technique is operative to handle changes or modifications to the baseline (reference) configuration where it is applicable (e.g., required, effective, etc.). The baseline configuration is typically first set when entering showtime and is then usually updated partially. Alternatively, usually more rarely, the baseline configuration is updated in full. The baseline configuration is stored (e.g., in memory mechanisms, devices) both at the DP side as well as the CPE side. Specifically, transmission parameter controllers $122_1, \ldots, 122_N$ (not shown) at the CPE side and transmission parameter controller 114 at the DP side are operative to store the baseline configuration. In general, a loss of configuration synchronization between the baseline configuration that is stored at the receiver and that stored at the transmitter may lead to an unrecoverable loss of connectively therebetween. To at least attempt to prevent such an unrecoverable loss of connectivity, the disclosed technique may employ at least part of the following rules for the baseline (reference) configuration, which may also apply for temporary (active) configurations:

1. The system configuration that is used when entering showtime is considered as a first (initial) baseline configuration.
2. A baseline configuration change count (BCCC) is maintained at both the receiver side and at the transmitter side. The BCCC counts the number of baseline configurations generated since first link establishment between the receiver and transmitter sides.
3. A request for a baseline configuration change is typically initiated by the receiver. (There may be particular cases where requests for baseline configuration changes are initiated by the transmitter.)
4. A baseline update initiator (i.e., one that initiates baseline updates, e.g., the receiver or transmitter) tags (i.e., labels, marks) a baseline configuration change with a BCCC value that the configuration implementing these changes will have. For example, the first OLR request after entering showtime will be tagged with BCCC=1; the following request will be tagged with BCCC=2, and so forth.
5. The receiver initiates a new change request for baseline configuration after the previous change request for baseline configuration is implemented.
6. OLRs possessing the same BCCC value are considered identical (i.e., this means that the transmitter can discard requests with BCCC that is equal or lower than that of the baseline configuration that is currently employed).
7. New or modified baseline configurations are changed (e.g., substituted) on the boundaries of a logical frame, typically with changes being synchronized to a superframe beginning (i.e., a special case of this rule).
8. Information pertaining to the BCCC of the transmitter-employed baseline configuration may be included in each robust management channel (RMC) message.

The above set of rules (1 through 8) confer some degree of robustness in facilitating and maintaining synchronization even in the event of a synchronization loss (i.e., since synchronization may be regained upon reception of an undamaged OLR message).

According to another aspect of the disclosed technique, there is thus provided a method for timed synchronization of the implementation of system configuration parameters via OLR between transmitter-receiver pairs (e.g., DP 104 and CPE $104_1$) of communication system 100. This method, in accordance with this aspect of the disclosed technique, allows for timed synchronization of the implementation of reference (baseline) configurations as well as timed synchronization of the implementation of temporary configurations (i.e., in relation to respective reference configurations). Time-wise synchronization of the implementation of a new baseline configuration is crucial so as to allow error free operation of communication system 100. ITU-T G993.2 standard specifies synchronization of a configuration change based on the inversion of a synchronization flag (sync symbol), typically sent once every multiple frames. The synchronization flag is used as an indication to the exact timing of the configuration change. Using an inverted synchronization flag as a marker for indicating when a configuration change shall occur has at least three basic drawbacks:

1) Compatibility issue with Walsh-Hadamard (WH) sequences used for vectoring. Essentially, the WH sequence is employed to allow removal of the influence of synchronization symbols sent via other communication links, during measurement for example of communication channel responses. The WH sequence is implemented typically by multiplying the synchronization symbol by +1 or −1 according to one of pre-known orthogonal sequences, such that each communication link employs a different sequence so as to maintain orthogonality therebetween.
2) If an indication (marker) is lost, the communication link (i.e., between transmitter and receiver) loses synchronization until the next synchronization can be verified (typically a full super-frame later).
3) Implemented changes are limited in granularity to super-frames (i.e., not to individual frames making up a super-frame).

Figure 5:
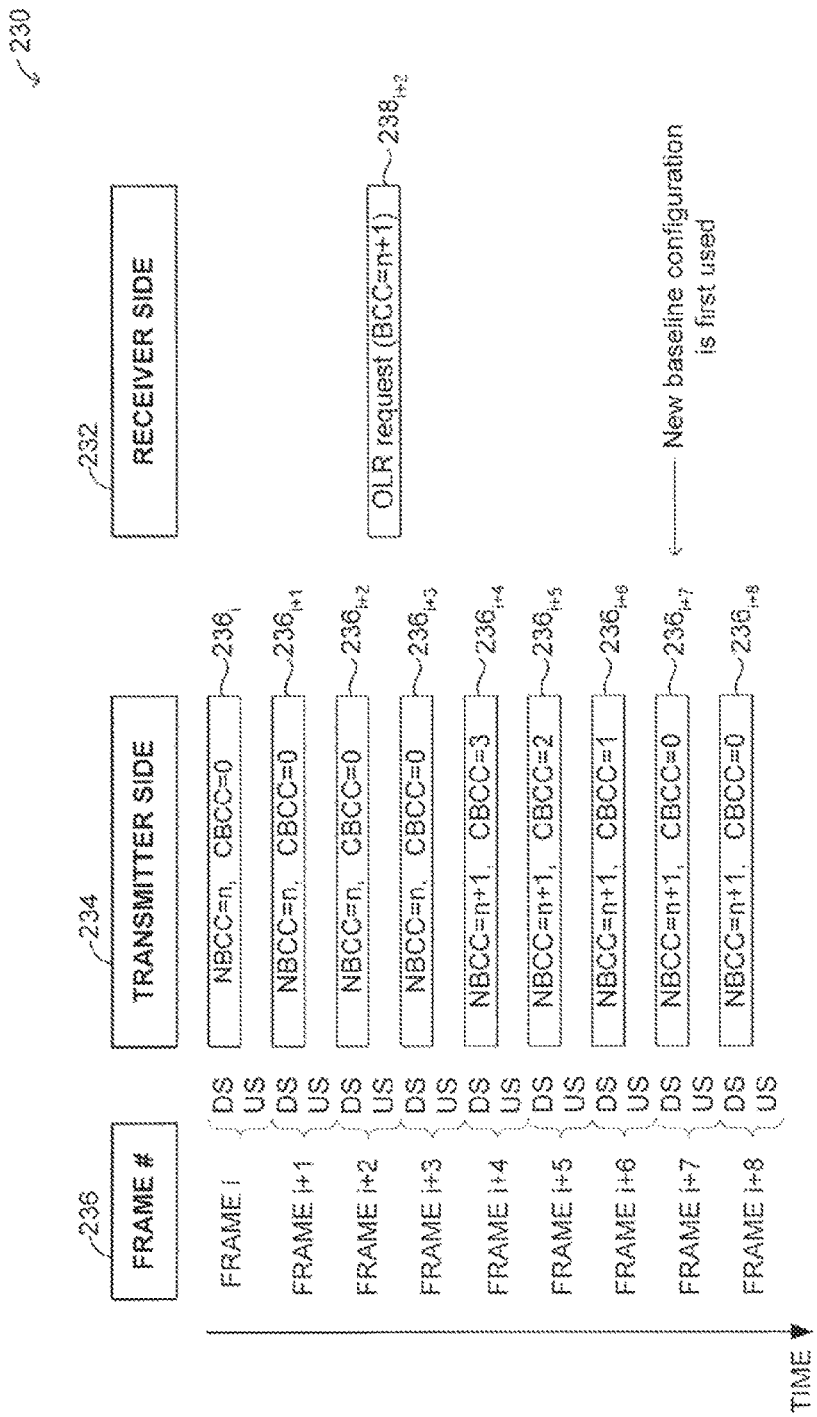
FIG. 5 is a schematic diagram illustrating an example of a configuration change sequence, constructed and operative in accordance with another aspect of the disclosed technique.

The disclosed technique proposes an alternative to the known synchronization flag method, namely an RMC-based mechanism for time-wise synchronizing the implementation of two types of configuration changes: baseline (reference configuration) changes and temporary configuration changes. Timed synchronization of the implementation of baseline configuration changes is described first. A time-wise synchronized state is when a receiver and a transmitter of the communication system employ identical system configuration parameters at the same time. Time-wise synchronization of the implementation of a baseline (reference) configuration change involves transmission by an initiating communication entity (i.e., receiver or transmitter) an OLR message (via the RMC) that includes a timing sequence. This timing sequence indicates a remaining time to when an updated baseline configuration time shall occur in relation to a time-dependent reference that is known to both the initiating communication entity and the destination communication entity (i.e., a communication entity to which the OLR message is intended). Particularly, the timing sequence may be a countdown timing sequence that progressively indicates the remaining time to the moment when the baseline configuration change is to occur. The time-wise synchronization that establishes when the implementation of a new baseline configuration will occur employs indicators that are encoded in at least two fields to provide an indication of the current status of synchronization at any particular time (i.e., or frame number). Two such indicators are a new baseline configuration count (NBCC) and a countdown to the implementation of NBCC (CBCC). The OLR message may be an autonomous OLR command that is sent by the transmitter. Alternatively, the OLR message may be an OLR response to a received OLR message (request) previously sent by the receiver. To further explicate the particulars of this method, reference is now further made to FIG. 5, which is a schematic diagram illustrating an example of a configuration change sequence, generally referenced 230, constructed and operative in accordance with another aspect of the disclosed technique. FIG. 5 shows a receiver (side) 232, a transmitter (side) 234, and a frame number 236. Frame number 236 identifies and enumerates a frame (frame i, frame i+1, etc.). A vertical position in FIG. 5 represents time in progressing frame units. It is generally noted that according to one mode of operation, receiver 232 may be one of CPE units $104_1, \ldots, 104_N$ and transmitter 234 may be DP 102. In another mode of operation, receiver 232 is DP 102 and transmitter 234 is one of CPE units $104_1, \ldots, 104_N$. In accordance with either mode of operation, receiver side 232 and transmitter side 234 are communicatively coupled with each other to allow for data communication to be communicated therebetween as well for the purpose of establishing synchronized configurations. Transmitter side 234 maintains the values of indicators NBCC and CBCC at every frame, denoted by $236_i, 236_{i+1}, \ldots,$ and $236_{i+8}$. The CBCC field maintains a countdown to the implementation of the new baseline configuration. The CBCC is progressively decremented from the initial value at each frame, until reaching the value of zero (i.e., CBCC=0) at which point that indicates the first frame implementing the new configuration. The value zero is essentially a reference point that is known to both receiver side 232 and transmitter side 234. The reference point may be other agreed-upon numbers (e.g., 100 in a count-up counting sequence, −20, and the like). The value of CBCC is equated to zero until a new configuration change count is initiated. With reference to FIG. 5, at frames i through i+2 the NBCC value equals n and the CBCC value equals zero. According to another implementation of the configuration change sequence, two baseline configuration indicators are employed (not shown): one indicator (e.g., a counter) that indicates the baseline configuration that is currently in use in the current (present) frame, and another indicator (e.g., a counter) that indicates the next system configuration that is to take effect.

Suppose receiver side 232 initiates and conveys via an RMC an OLR request $238_{i+2}$ at frame i+2 (i.e., during the downstream (DS)) that is received by transmitter during the upstream (US) part of frame i+2. OLR request $238_{i+2}$ specifies a change to the baseline (reference) configuration and designates the proposed new configuration change by a baseline configuration count (BBC) as n+1. FIG. 5 shows that receiver side 232 initiates a configuration change at frame i+2, in response to which transmitter side 234 selects to implement the change at frame i+7, starting a countdown sequence three frames earlier at frame i+4. The CBCC is progressively decremented from the initial countdown value (i.e., 3) at each frame until equaling the value of zero at frame i+7, which is when the new baseline configuration is first implemented. In cases where the CBCC value is zero (e.g., at frame i+8, following a configuration change), the value of NBCC is the baseline configuration that is currently employed (i.e., for a particular RMC message). For CBCC greater than zero, the NBCC is the change count of the next configuration that shall be employed (i.e., the configuration that will be in effect once the countdown sequence reaches the value of zero). Typically, for changes that do not occur too fast (e.g., at every frame), the NBCC value can reset or looped (e.g., following a count of 8 or 16) with no issues of ambiguity. Furthermore, by utilizing rule 5 hereinabove, whereby a new configuration change can be requested after the previous change was implemented, it may be sufficient to send only the least significant bit (lsb) of the NBCC. At any rate, when compared with the inverted synchronization flag method, this method of the disclosed technique includes the following advantages:

1) For the receiver it is sufficient to correctly decode one of K messages (i.e., with K representing the countdown sequence length, K=4 in our example shown in FIG. 5) to be able to change to the new configuration in time. In the case of the inverted synchronization flag method there is basically only one opportunity.
2) In particular cases there may be for example, detrimental noise impulses that may erase data carried by multiple frames including the entire set of countdown RMC messages. In such cases, a change to the new configuration can be identified by the receiver at the time of reception of the earliest uncorrupted RMC message.
3) There are essentially no known compatibility issues with vectoring training sequences.

A second type of configuration change involves temporary changes. The time-wise synchronization of the implementation of the temporary changes will now be described in accordance with the principles of the disclosed technique. Temporary changes to system configuration parameters are changes that are applied on top of (i.e., onto, over) the baseline configuration, without changing the baseline configuration itself. An example of temporary changes involves a selection of a particular bit loading table from a set of bit loading tables that are defined in the baseline configuration. Another example involves an OLR message (not shown) that defines a differential rate reduction that is relative to the configuration (currently used) specifying modifications to the bit loading table held in the baseline configuration. In this case, if for example, a new temporary change message arrives and defines a new rate reduction, this new rate reduction is applied onto the original baseline (reference) configuration and not to the configuration table that was derived based on a previous OLR message. Another example of temporary configuration changes involves transmission of the determined differential or delta values in relation to the known baseline configuration. Temporary messages may be used as a way of changing the configuration in response to sudden events (e.g., sudden noise changes) without the need to provide a complex synchronization mechanism that is intermediate in effectiveness between the 'fast' OLR request and the slower 'standard' OLR.

The time-wise synchronization of the implementation of temporary changes may employ a scheme that is similar to that described in conjunction with FIG. 5. Time-wise synchronization of the implementation of a temporary change involves transmission by the initiating communication entity (i.e., receiver or transmitter) an OLR message via the RMC that includes a counting sequence (e.g., a timing sequence) that indicates a remaining count (e.g., a remaining time) to when an update configuration point (e.g., update configuration time) shall occur. The update configuration point is defined in relation to a reference point. The reference point involves two aspects. According to one aspect, the reference point is an indicator that is used as a reference for comparing or describing other entities to it (e.g., a time-dependent reference such as a specified time, a time standard, current frame time, a reference clock, etc.) that is known to both the initiating communication entity and the destination communication entity (i.e., a communication entity to which the OLR message is intended). According to another aspect the reference point is a criterion that forms a basis upon which an assessment or particular function is performed (e.g., regarding a value in a countdown sequence that counts toward the occurrence of the configuration update point, such as the number zero in a countdown sequence, the number 100 in a count-up sequence, etc.). According to one mode of operation, the counting sequence is a time sequence (i.e., that is time-dependent). Particularly, the timing sequence may be a countdown timing sequence that progressively indicates the remaining time to the when the temporary configuration change is to occur. Such a countdown timing sequence to the implementation of temporary configuration change is herein denoted as "CDTC". Alternatively, other timing sequences may be employed. For example, a count-up timing sequence may be used to progressively count or indicate a current time in relation to a time-dependent reference point at which the updated temporary configuration will take effect. Generally, the reference point that is known to both first and second communication entities may specify a point (e.g., a reference time) in the counting sequence (e.g., timing sequence). For example, in a countdown sequence (e.g., 6, 5, 4, 3, 2, 1, 0), a particular number (i.e., the reference point) may indicate an agreed upon point where the configuration update is implemented (e.g., the number 0).

An OLR request for a temporary configuration change may typically contain less information in comparison to an OLR request for a full baseline configuration change. An OLR request for a temporary configuration change, may typically include the following information: changes to the bit-loading table per sub-band (i.e., a sub-band is a group of one or more subcarriers), changes to the gains per sub-band, an identification number that identifies an index of a reference table over which modifications shall be applied to construct the temporary configuration, a mathematical function through which temporary configurations may be generated from the baseline configuration using the specified parameters, the CDTC, an ID (configuration) number, and the like. In a special case where the temporary configuration is identical to the baseline configuration, no adjustments (changes, modifications) are applied onto the baseline configuration to construct the temporary configuration. Various techniques may be employed to convey information relating to the temporary configuration change. Firstly, information pertaining the required temporary configuration change may be explicitly conveyed (e.g., in the form of a table selection that includes a table index) via the OLR request via the RMC. Secondly, in the case of "larger" sized OLR messages (i.e., in comparison to the preceding technique) a configuration index is included in the OLR receiver-initiated request. This configuration index is an identifier that refers to a particular system configuration that is known to both transmitter and receiver, whose future implementation is progressively counted down (or counted up) toward a configuration update point, for example, a number such as zero, where the selection of the number zero functions as the reference point that is known to both transmitter and receiver.

Figure 6:
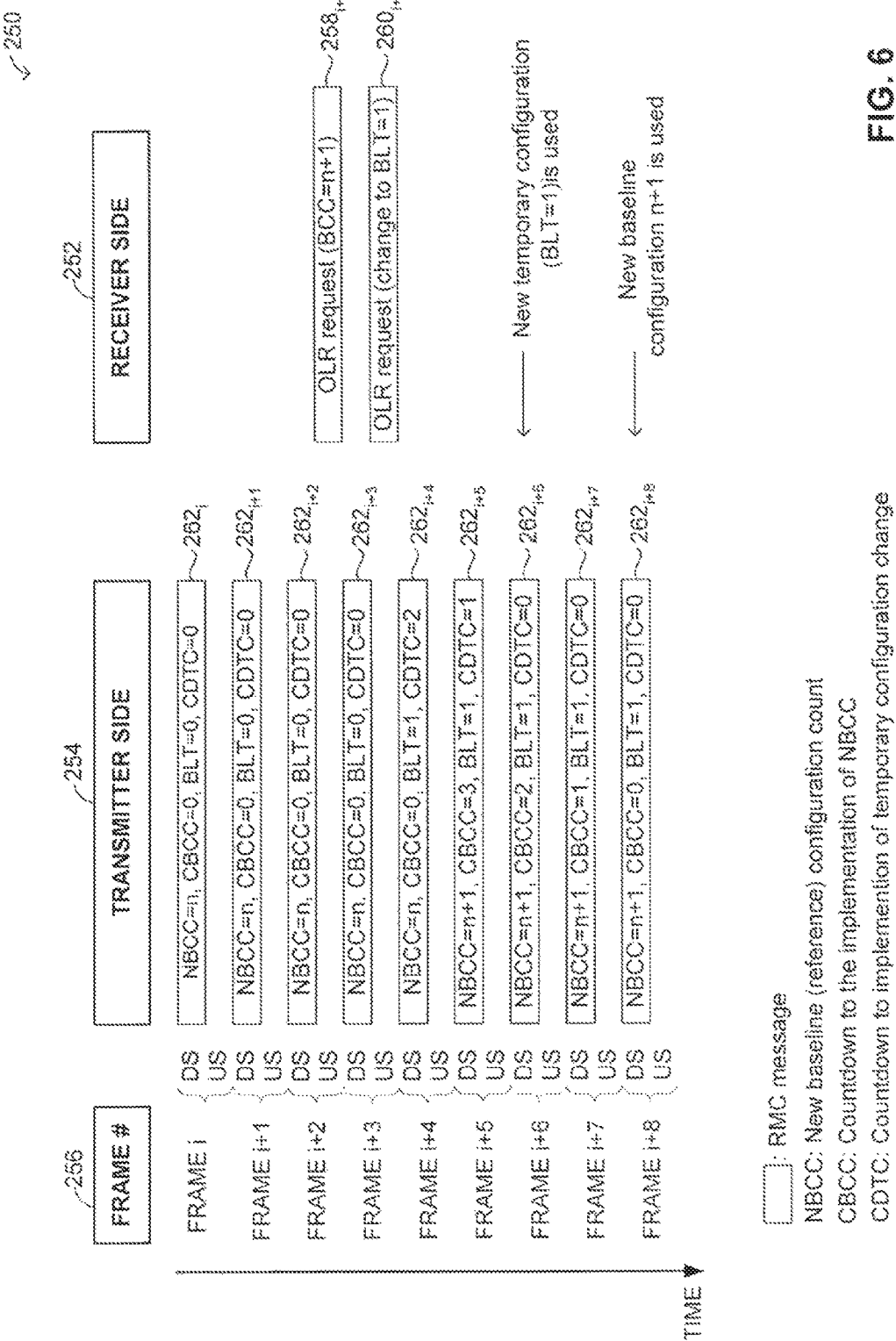
FIG. 6 is a schematic diagram illustrating an example of a baseline configuration change sequence in conjunction with a temporary configuration change sequence, constructed and operative in accordance with the disclosed technique.

To further elucidate how temporary configuration changes are implemented by the disclosed technique, reference is now further made to FIG. 6, which is a schematic diagram illustrating an example of a baseline configuration change sequence in conjunction with a temporary configuration change sequence, generally referenced 250, constructed and operative in accordance with the disclosed technique. Similarly, to FIG. 5, FIG. 6 illustrates a receiver (side) 252, a transmitter (side) 254, and a frame number 256. Frame number 256 identifies and enumerates a frame (frame i, frame i+1, etc.). A vertical position in FIG. 6 represents time in progressing frame units (i.e., from top to bottom of the Figure). It is generally noted that according to one mode of operation, receiver side 252 may represent one of CPE units $104_1, \ldots, 104_N$ and transmitter side 254 may represent DP 102. In another mode of operation, receiver side 252 represents DP 102 and transmitter 254 represents one of CPE units $104_1, \ldots, 104_N$. In accordance with either mode of operation, receiver side 252 and transmitter side 254 are communicatively coupled with each other to allow for data communication to be communicated therebetween as well for the purpose of establishing synchronized configurations and timed synchronization of the implementation of new baseline and temporary system configurations. Transmitter side 254 maintains the values of indicators NBCC, CBCC, BLT (bit loading table indicator), and CDTC at every frame, denoted by $262_i, 262_{i+1}, \ldots, 262_{i+8}$. Receiver side 252 also maintains values of indicators NBCC, CBCC, BLT, and CDTC (not shown). At stated hereinabove in relation to FIG. 5, the CBCC field maintains a countdown to the implementation of the new baseline configuration. The NBCC field maintains the status of the baseline configuration count. The CDTC field maintains counting sequence values (e.g., a countdown) to the implementation to the temporary configuration change. The CDTC value progressively changes count value (e.g., counts down) from an initial value (e.g., 3) until a reference point (e.g., zero value, CDTC=0) is reached in the count, at which point the temporary configuration is implemented simultaneously by both transmitter side 252 and receiver side 254. At any rate, it is noted that the receiver of the OLR request may further modify information pertaining to the OLR request so as to form a modified OLR request (message—not shown), that is sent back to the transmitter of the original OLR request (i.e., the OLR initiator).

The following example illustrated in FIG. 6 demonstrates how a baseline configuration change may be performed in conjunction with a temporary configuration change. FIG. 6 serves as an example for the purpose of elucidating the disclosed technique. Other ways may be employed, according to the principles of the disclosed technique, for performing synchronized implementation of system configuration parameter changes. Suppose receiver side 252 initiates and conveys via an RMC an OLR request $258_{i+2}$ for a baseline configuration change at frame i+2 that is received by transmitter during the upstream part of frame i+2. OLR request $258_{i+2}$ for baseline configuration change specifies a change to the baseline (reference) configuration and designates the proposed new configuration change by a baseline configuration count (BBC) as n+1. Transmitter side 254 receiving OLR request $258_{i+2}$ selects to implement the baseline configuration change at frame i+8, starting a countdown sequence three frames earlier at frame i+5. The CBCC is progressively decremented from the initial countdown value (i.e., 3) at each frame until equaling the value of zero at frame i+8, whereupon the new baseline configuration is simultaneously implemented by both transmitter side 254 and receiver side 252.

With regard to a request for temporary configuration change, suppose receiver side 252 initiates and conveys via an RMC an OLR request $260_{i+3}$ for a temporary configuration change to the BLT at frame i+3 that is received by transmitter side 254 during the upstream part of frame i+3. OLR request $260_{i+3}$ for temporary configuration change specifies a change to system configuration parameters in relation to the baseline (reference) configuration (BLT=0). Specifically, the temporary configuration change specifies a change to the BLT from that which is initially used, i.e., BLT=0 to BLT=1 (newly proposed). Following reception of OLR request $260_{i+3}$ by transmitter side 254 (at frame i+3), a progressive counting sequence (e.g., a countdown) is initiated at frame i+4 for implementation of the temporary configuration (i.e., BLT=1) in two frames from i+4, hence at frame i+6. This is represented in FIG. 6 by a progressively decreasing CDTC from CDTC=2 at frame i+4 to CDTC=0 at frame i+6. FIG. 6 shows that although two parallel system configuration changes are performed concurrently, the use of separate counting sequences (e.g., countdown signals, countdown designators) precludes ambiguity as to the exact configuration, whether baseline or temporary, that is used at each frame. FIG. 6 shows a simplified example where it is selected to limit the scope of temporary configuration changes to the scope of the baseline configuration. In cases where it is required for temporary configuration changes to be applied to a previous baseline configuration as well as to a proposed new baseline configuration, such temporary configuration changes may be typically sent together with the proposed new baseline configuration request (not shown).

Figure 7:
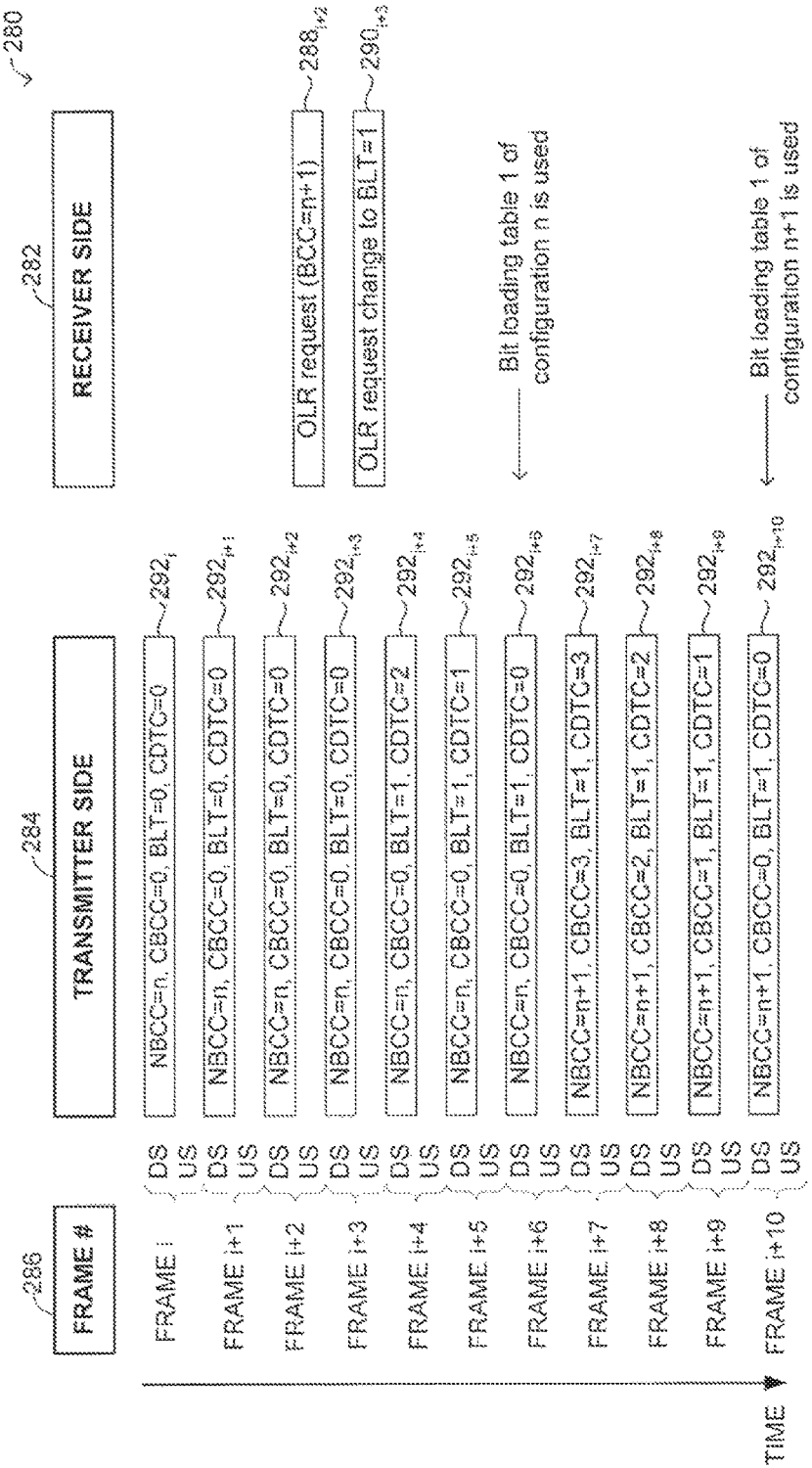
FIG. 7 is a schematic diagram illustrating an example of a baseline configuration change in conjunction with a temporary configuration change, where the temporary configuration change is bounded to the baseline configuration to which it relates and applied to, constructed and operative in accordance with the disclosed technique.

Reference is now further made to FIG. 7, which is a schematic diagram illustrating an example of a baseline configuration change in conjunction with a temporary configuration change, where the temporary configuration change is bounded to the baseline configuration to which it relates and applied to, generally referenced 280, constructed and operative in accordance with the disclosed technique. FIG. 7 illustrates a receiver (side) 282, a transmitter (side) 284, and a frame number 286. Frame number 286 identifies and enumerates a frame (frame i, frame i+1, etc.). A vertical position in FIG. 7 represents time in progressing frame units (i.e., from top to bottom of the Figure). It is generally noted that according to one mode of operation, receiver side 282 may represent one of CPE units $104_1, \ldots, 104_N$ and transmitter side 284 may represent DP 102. In another mode of operation, receiver side 282 represents DP 102 and transmitter 284 represents one of CPE units $104_1, \ldots, 104_N$. In accordance with either mode of operation, receiver side 282 and transmitter side 284 are communicatively coupled with each other to allow for data communication to be communicated therebetween as well for the purpose of establishing synchronized configurations and timed synchronization of the implementation of new baseline and temporary system configurations. Transmitter side 284 maintains the values of indicators NBCC, CBCC, BLT (bit loading table indicator), and CDTC at every frame, denoted by $292_i, 292_{i+1}, \ldots, 292_{i+10}$. Receiver side 282 also maintains values of indicators NBCC, CBCC, BLT, and CDTC (not shown). At stated hereinabove in relation to FIGS. 5 and 6, the CBCC field maintains a countdown to the implementation of the new baseline configuration. The NBCC field maintains the status of the baseline configuration count. The CDTC field maintains counting sequence values (e.g., a countdown) to the implementation to the temporary configuration change.

FIG. 7 illustrates an example where a baseline (reference) configuration change is performed in parallel with a temporary configuration change, where the temporary change is bounded (i.e., limited, in the context of) to the baseline configuration to which it relates and applied to. Particularly, suppose a receiver 282 initiates and conveys via an RMC an OLR request $288_{i+2}$ for a baseline configuration change at frame i+2 that is received by transmitter during the upstream part of frame i+2. OLR request $288_{i+2}$ for baseline configuration change specifies a change to the baseline (reference)

configuration and designates the proposed new configuration change by a baseline configuration count (BBC) as n+1. Transmitter side 284 receiving OLR request $288_{i+2}$ selects to implement the new baseline configuration change at frame i+10, starting a countdown sequence three frames earlier at frame i+7. The CBCC is progressively decremented from the initial countdown value (i.e., 3) at each frame until equaling the value of zero at frame i+10, whereupon the new baseline configuration is simultaneously implemented by both transmitter side 284 and receiver side 282. Concurrently, receiver side 252 initiates and conveys via an RMC an OLR request $290_{i+3}$ for a temporary configuration change to the BLT at frame i+3 that is received by transmitter side 284 during the upstream part of frame i+3. OLR request $290_{i+3}$ for temporary configuration change specifies a change to system configuration parameters in relation to the baseline (reference) configuration (BLT=0). Specifically, the temporary configuration change specifies a change to the BLT from that which is initially used, i.e., BLT=0 to BLT=1 (newly proposed). Following reception of OLR request $290_{i+3}$ by transmitter side 284 (at frame i+3), a progressive counting sequence (e.g., a countdown) is initiated at frame i+4 for implementation of the temporary configuration (i.e., BLT=1) in two frames from i+4, hence at frame i+6. This is represented in FIG. 7 by a progressively decreasing CDTC from CDTC=2 at frame i+4 to CDTC=0 at frame i+6. FIG. 7 shows that the temporary configuration change of BLT=1 is implemented starting at frame i+6. At the following frame, i+7, the CDTC restarts countdown so as to be synchronized with the planned baseline configuration change at frame i+10. At frame i+10, the new baseline configuration takes effect, whereupon the temporary configuration equals to baseline configuration. Any new requests for temporary configuration changes will be in relation to and applied to the current baseline configuration. In that respect, the temporary configuration is limited or bounded by the currently employed baseline configuration, as newly proposed changes to the temporary configuration will be in relation to the current baseline configuration. At any rate, both baseline configuration changes as well as temporary configuration changes are implemented in synchrony (i.e., at a particular reference point) between receiver side 282 and transmitter side 284, thereby facilitating maintenance of synchronization of system configuration parameters.

Figure 8:
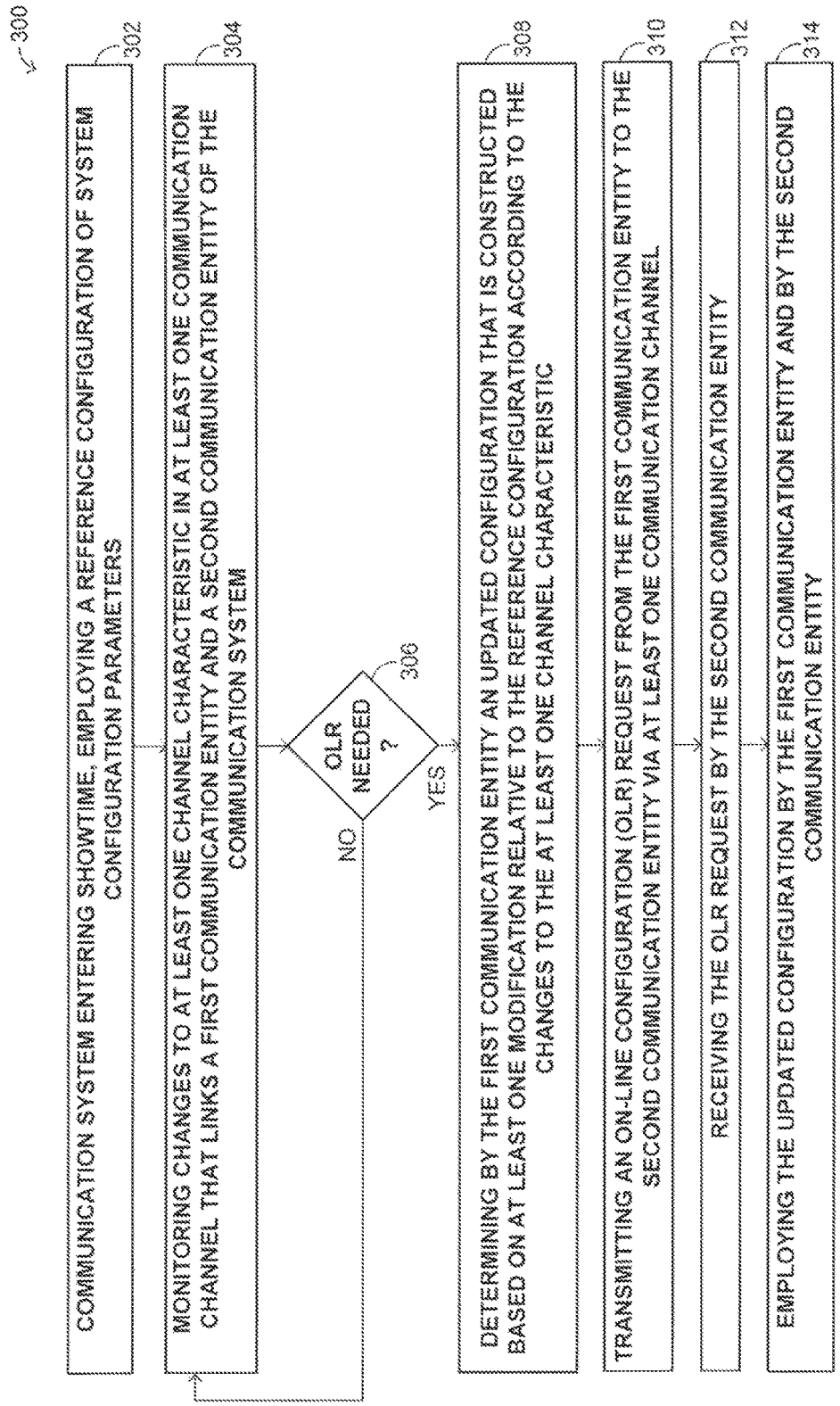
FIG. 8 is a schematic block diagram of a method for maintaining configuration synchronization via an on-line reconfiguration (OLR) of system configuration parameters in a communication system, constructed and operative in accordance with one aspect of the disclosed technique.

Reference is now made to FIG. 8, which is a schematic block diagram of a method for maintaining configuration synchronization via an on-line reconfiguration (OLR) of system configuration parameters in a communication system, generally referenced 300, constructed and operative in accordance with one aspect of the disclosed technique. Method 300 initiates in procedure 302. In procedure 302, the communication system enters showtime employing a reference configuration of system configuration parameters. With reference to FIGS. 2 and 3, communication system 100 (FIG. 2) enters showtime employing a reference (baseline) configuration 152 (FIG. 3) shown by solid line 154. (When entering showtime, the temporary configuration may be identical with the baseline configuration.)

In procedure 304, at least one channel characteristic in at least one communication channel that links a first communication entity and a second communication entity of the communication system is monitored for changes. With reference to FIGS. 2 and 3, changing channel characteristics (such as SNR, BLER, changes in the transmit path where precoder updates require configuration changes, and the like) of communication channels $106_1, \ldots, 106_N$ are monitored by line condition monitors $120_1, \ldots, 120_N$ at the CPE side or by line condition monitors $112_1, \ldots, 112_N$ at the DP side, respective (according to index) (FIG. 2). Communication channels $106_1, \ldots, 106_N$ link transceiver pairs at the CPE side (i.e., $118_1, \ldots, 118_N$) with respective transceivers (i.e., $110_1, \ldots, 110_N$) at the DP side.

In procedure 306, a determination is made whether at least one change to the monitored channel characteristics necessitates change to system configuration parameters via on-line reconfiguration (OLR). In case the result of the determination is negative, procedure 306 is directed back (i.e., looped) to procedure 304. In case the result of the determination is positive, procedure 308 is directed to procedure 308. With reference to FIG. 2, transmission parameter controllers $122_1, \ldots, 122_N$ at the CPE side determine for each respective communication channels $106_1, \ldots, 106_N$ whether the monitored channel characteristics necessitate a change to system configuration parameters (e.g., BLT, gain parameters, etc.) via OLR. Alternatively, at the DP side, transmission parameter controller 114 determines for each respective communication channels $106_1, \ldots, 106_N$ whether the monitored channel characteristics necessitate a change to system configuration parameters via (OLR). It is noted that procedure 306 may include the monitoring of ACK or NACK messages that are received by the transmitter.

Alternatively, according to another mode of operation (not shown) of system 100 (FIG. 2), the temporary (active) configuration is continuously (i.e., reiteratively) sent (i.e., by the receiver or transmitter) by use of a configuration state message even when changes to system configuration parameters are not required. This mode of operation may be advantageously employed for increasing robustness in the maintenance and synchronization of system configuration parameters. In such a case, such a configuration state message of temporary configuration parameters may include the specific configuration ID employed as well as explicit recitation of at least part of the configuration parameters.

In procedure 308, an updated configuration that is constructed based on at least one modification relative to the reference (baseline) configuration is determined by the first communication entity, according to changes to the at least one channel characteristic. With reference to FIGS. 2 and 3, and in case the first communication entity is one of CPE units $104_4, \ldots, 104_N$, (FIG. 2) the respective transmission parameter controller $122_1, \ldots, 122_N$ determines an updated configuration (e.g., temporary configuration 158 of FIG. 3, denoted by dotted line 160 and table 162) that is relative to reference configuration 154, according to monitored and detected changes to at least one of channel characteristic (e.g., SNR) of signals (not shown) communicated via respective communication channels $106_1, \ldots, 106_N$. Alternatively, in case the first communication entity is DP 102, transmission parameter controller 114 determines an updated configuration (e.g., temporary configuration 158 of FIG. 3, denoted by dotted line 160 and 162) that is relative to reference configuration 154, according to monitored and detected changes to at least one of channel characteristic of signals communicated via respective communication channels $106_1, \ldots, 106_N$.

In procedure 310 an on-line reconfiguration (OLR) request is transmitted from the first communication entity to the second communication entity via at least one of the communication channels. With reference to FIGS. 2 and 3, OLR request 156 (FIG. 3) is transmitted by the first communication entity (FIG. 1, e.g., at least one of CPE units $104_1, \ldots, 104_N$) to the second communication entity (e.g., DP 102) via respective communication channels $106_1, \ldots, 106_N$. Alternatively, if the first communication entity is DP 102, OLR request 156 (FIG. 3) is transmitted therefrom to the second communication entity, namely, at least one of CPE units $104_1, \ldots, 104_N$ via respective communication channels $106_1, \ldots, 106_N$.

In procedure 312 the OLR request is received by the second communication entity. With reference to FIGS. 2 and 3, in the case where in preceding procedure 310 the first communication entity is the CPE side (i.e., at least one of CPE unit $104_1, \ldots, 104_N$), then OLR request 156 (FIG. 3) is received by DP 102 (FIG. 2). In case where in preceding procedure 310 the first communication entity is the DP side, then OLR request 156 (FIG. 3) is received by the CPE side (i.e., at least one of CPE units $104_1, \ldots, 104_N$).

In procedure 314 the updated configuration is employed by the first communication entity and by the second communication entity. With reference to FIGS. 2 and 3, updated temporary configuration 158 (FIG. 3) specifically denoted by dotted line 160 is employed by the first communication entity (FIG. 2: e.g., CPE side or DP side) and by the second communication entity (FIG. 2: e.g., DP side or CPE side).

Figure 9:
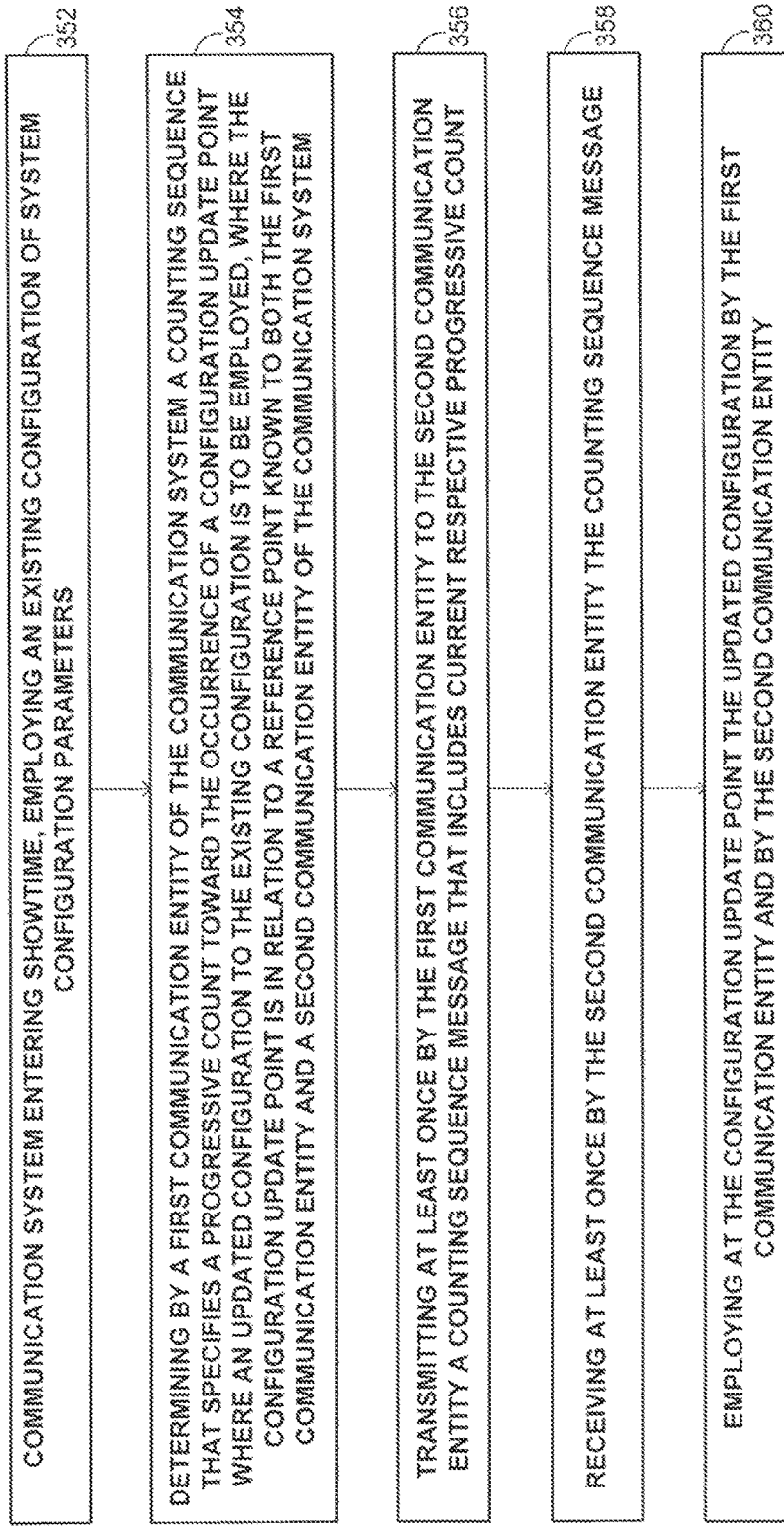
FIG. 9 is a schematic block diagram of a method for timed synchronization of the implementation of system configuration parameters via on-line reconfiguration (OLR) in a communication system, constructed and operative in accordance with another aspect of the disclosed technique.

Reference is now made to FIG. 9, which is a schematic block diagram of a method for timed synchronization of the implementation of system configuration parameters via on-line reconfiguration (OLR) in a communication system, generally referenced 350, constructed and operative in accordance with another aspect of the disclosed technique. Method 350 initiates in procedure 352. In procedure 352, the communication system enters showtime employing an existing configuration of system configuration parameters. With reference to FIGS. 2 and 3, communication system 100 (FIG. 2) enters showtime employing an existing configuration 152 (FIG. 3) shown by solid line 154.

In procedure 354, a counting sequence that specifies a progressive count toward the occurrence of a configuration update point where an updated configuration to the existing configuration is to be employed is determined by the first communication entity. The configuration update point is in relation to a reference point that is known both to the first communication entity and to the second communication entity. Procedure 354 may be typically time-dependent in the sense that counting sequence is a timing sequence, progressive count is a countdown (count-up) time count, the configuration update point is a configuration update time, and reference point is a reference time. With reference to FIGS. 2 and 5, a counting sequence indicated by field CBCC (FIG. 5) at least in RMC messages $236_{i+4}$, $236_{i+5}$, $236_{i+6}$, and $236_{i+7}$ specify a progressive count (i.e., CBCC=3, CBCC=2, CBCC=1, and CBCC=0) toward the occurrence of a configuration update point (i.e., in FIG. 5 at frame i+7) where an updated configuration (i.e., indicated by field NBCC and having a value n+1) to the existing configuration (i.e., NBCC=n) is to be employed. This is determined by the first communication entity (e.g., typically transmitter side 234 illustrated in FIG. 5). Receiver side is CPE side (FIG. 2). Alternatively, receiver side is DP side (FIG. 2).

In procedure 356, a counting sequence message that includes current respective progressive count is transmitted at least once by the first communication entity to the second communication entity. With reference to FIGS. 2 and 5, an OLR message $238_{i+2}$ (FIG. 5) is transmitted at least once by the first communication entity (i.e., either one of CPE units $104_1, \ldots, 104_N$ or DP 102—in FIG. 2) to the second communication entity (i.e., in reverse order: DP 102 or either one of CPE units $104_1, \ldots, 104_N$).

In procedure 358, the counting sequence message is received at least once by the second communication entity. With reference to FIGS. 2 and 5, if the first communication entity detailed in preceding procedure 356 is one of CPE units $104_1, \ldots, 104_N$ (FIG. 2), then the second communication entity is DP 102 which receives OLR request (for CPE transmitter initiated OLR) or OLR response (for DP receiver initiated OLR) $238_{i+2}$ containing a progressive count (not shown). In case the first communication entity detailed in preceding procedure 356 is DP 102 (FIG. 2), then the second communication entity is at least one of CPE units $104_1, \ldots, 104_N$ receives OLR request $238_{i+2}$ (for DP transmitter-initiated OLR) or OLR response (for CPE-receiver initiated OLR).

In procedure 360, the updated configuration is employed at the update configuration point by the first communication entity and by the second configuration entity. With reference to FIGS. 2 and 5, updated configuration, defined by OLR request $238_{i+2}$ (FIG. 5) is employed at frame i+7 by the CPE side (FIG. 2) and by the DP side (FIG. 2).

It will be appreciated by persons skilled in the art that the disclosed technique is not limited to what has been particularly shown and described hereinabove. Rather the scope of the disclosed technique is defined only by the Claims, which follow.

The invention claimed is:

1. A method for maintaining configuration synchronization via an on-line reconfiguration (OLR) of system configuration parameters in a communication system having at least a first communication entity and a second communication entity that employ a baseline configuration of system parameters, the method comprising the procedures of:
    monitoring changes to at least one channel characteristic in at least one communication channel that links said first communication entity and said second communication entity;
    determining by said first communication entity an active configuration that is constructed based on at least one modification relative to said baseline configuration without changing said baseline configuration itself, according to said changes to said at least one channel characteristic;
    transmitting an OLR request from said first communication entity to said second communication entity via said at least one communication channel;
    receiving said OLR request by said second communication entity;
    employing said active configuration by said first communication entity and by said second communication entity; and
    determining a need for a change to said baseline configuration;
    wherein when said change to said baseline configuration is determined, communicating between said first communication entity and said second communication entity, an updated baseline configuration, and employing said updated baseline configuration by said first communication entity and by said second communication entity.

2. The method according to claim 1, wherein according to a first mode of operation of said communication system, said first communication entity is operative as a receiver, and said second communication entity is operative as a transmitter, wherein said OLR request relates to changes in said system configuration parameters of said receiver.

3. The method according to claim 1, wherein according to a second mode of operation of said communication system, said first communication entity is operative as a transmitter, and said second communication entity is operative as a receiver, wherein said OLR request relates to changes in said system configuration parameters of said transmitter.

4. The method according to claim 1, wherein said at least one channel characteristic is selected from a list consisting of:
- signal-to-noise ratio (SNR);
- far-end-cross talk (FEXT) level;
- signal-to-noise-plus-interference ratio (SNIR);
- signal-to-FEXT ratio;
- noise characteristics of said at least one channel;
- transfer function related characteristic;
- acknowledgement (ACK)/disacknowledgement (NACK) indications;
- changes in a transmit path between said first communication entity and said second communication entity;
- block-error-rate (BLER); and
- bit-error-rate (BER).

5. The method according to claim 1, wherein said first communication entity constructs said OLR request that is in the form of an OLR message that includes information pertaining to said active configuration.

6. The method according to claim 5, wherein information pertaining to said active configuration is selected from a list consisting of:
- temporary bit-loading table (BLT) per subcarrier;
- temporary bit-loading (BLT) per sub-band;
- changes to gains per sub-band;
- changes to gains per subcarrier;
- relative changes (deltas);
- differential changes in bit-loading;
- framing parameters;
- data transmission unit (DTU) size;
- identification (ID) number that identifies an index of a reference table over which modifications shall be applied to construct said active configuration;
- mathematical function via said active configuration is constructed;
- a counting sequence toward implementation of said active configuration;
- an algorithm specifying how to construct said active configuration from at least one modification to said baseline configuration;
- a pointer to at least one database entry specifying said active configuration;
- full change to said baseline configuration;
- partial change to said baseline configuration; and
- no change to said baseline configuration.

7. The method according to claim 1, further comprising the procedures of:
- modifying said OLR request by said second communication entity to form a modified OLR request; and
- transmitting said modified OLR request by said second communication entity to said first communication entity.

8. The method according to claim 2, further comprising a procedure of determining by said transmitter a counting sequence that specifies a progressive count toward the occurrence of a configuration update point where said active configuration to said baseline configuration is to be employed.

9. The method according to claim 8, further comprising procedures of:
- transmitting at least once by said second communication entity to said first communication entity a counting sequence message that includes current respective said progressive count; and
- transmitting at least once by said first communication entity said counting sequence message.

10. The method according to claim 1, wherein said at least one modification to said baseline configuration is selected from a list consisting of:
- positive changes;
- negative changes;
- zero changes;
- differential changes;
- mathematical expression defining said modification;
- upper-limit; and
- algorithm defining said modification.

11. A communication system that maintains synchronization via an on-line reconfiguration (OLR) of system configuration parameters of the communication system, between at least a first communication entity in communication via at least one communication channel with a second communication entity that employ a baseline configuration of system parameters, the communication system comprising:
- a communication channel condition monitor of said first communication entity that monitors at least one communication channel characteristic of respective said at least one communication channel; and
- a transmission parameter controller of said first communication entity coupled with said communication channel condition monitor, said transmission parameter controller determines an active configuration that is constructed based on at least one modification relative to said baseline configuration without changing said baseline configuration itself, according to at least one change to said at least one communication channel characteristic;
- wherein said first communication entity communicates at least part of said active configuration to said second communication entity, so as to employ said active configuration by said first communication entity and said second communication entity;
- wherein said transmission parameter controller determines a need for a change to said baseline configuration;
- wherein when said change to said baseline configuration is determined, said first communication entity and said second communication entity communicate therebetween an updated baseline configuration and employ said updated baseline configuration.

12. The communication system according to claim 11, wherein according to a first mode of operation of said communication system, said first communication entity is operative as a receiver, and said second communication entity is operative as a transmitter, wherein an OLR request generated from said receiver relates to changes in said system configuration parameters of said receiver.

13. The communication system according to claim 11, wherein according to a second mode of operation of said communication system, said first communication entity is operative as a transmitter, and said second communication entity is operative as a receiver, wherein an OLR request generated from said transmitter relates to changes in said system configuration parameters of said transmitter.

14. The communication system according to claim 11, wherein said second communication entity further comprises:
- a communication channel condition monitor that monitors at least one communication channel characteristic of respective said at least one communication channel; and a transmission parameter controller coupled with said communication channel condition monitor of said second communication entity, said transmission parameter controller of said second communication entity determines an active configuration that is constructed based on at least one modification relative to said baseline configuration, according to at least one change to said at least one communication channel characteristic, wherein said second communication entity further communicates at least part of said active configuration to said first communication entity.

15. The communication system according to claim 11, wherein said at least one channel characteristic is an attribute of said at least one communication channel that influences the transmission and reception parameters of the respective said at least one communication channel.

16. The communication system according to claim 15, wherein said at least one channel characteristic is selected from a list consisting of:
signal-to-noise ratio (SNR);
far-end-cross-talk (FEXT) level;
signal-to-noise-plus-interference ratio (SNIR);
signal-to-FEXT ratio;
noise characteristics of said at least one channel;
transfer function related characteristics;
acknowledgement (ACK)/disacknowledgement (NACK) indications;
changes in a transmit path between said first communication entity and said second communication entity;
block-error-rate (BLER); and
bit-error-rate (BER).

17. The communication system according to claim 11, wherein information pertaining to said active configuration is selected from a list consisting of:
temporary bit-loading table (BLT) per subcarrier;
temporary bit-loading BLT per sub-band;
changes to gains per sub-band;
changes to gains per subcarrier;
relative changes (deltas);
differential changes;
identification (ID) number that identifies an index of a reference table over which modifications shall be applied to construct said active configuration;
mathematical function via said active configuration is constructed;
a counting sequence toward implementation of said active configuration;
an algorithm specifying how to construct said active configuration from at least one modification to said baseline configuration;
a pointer to at least one database entry specifying said active configuration;
full change to said baseline configuration;
partial change to said baseline configuration; and
no change to said baseline configuration.

18. The communication system according to claim 12, wherein said transmitter determines a counting sequence that specifies a progressive count toward the occurrence of a configuration update point where an active configuration to said baseline configuration is to be employed.

19. The communication system according to claim 11, wherein said system configuration parameters is selected from a list consisting of:
bit loading table (BLT);
gain tables;
framing parameters;
data transmission unit (DTU) size;
BLT per subcarrier; and
gain per subcarrier.

20. The communication system according to claim 11, wherein said at least one modification to said baseline configuration is selected from a list consisting of:
positive changes;
negative changes;
zero changes;
differential changes;
mathematical expression defining said modification;
upper limit; and
algorithm defining said modification.

* * * * *